United States Patent
Cao et al.

(10) Patent No.: US 11,265,896 B2
(45) Date of Patent: Mar. 1, 2022

(54) SYSTEMS AND METHODS FOR ASYNCHRONOUS GRANT-FREE ACCESS

(71) Applicants: Yu Cao, Kanata (CA); Jianglei Ma, Ottawa (CA); Liqing Zhang, Ottawa (CA)

(72) Inventors: Yu Cao, Kanata (CA); Jianglei Ma, Ottawa (CA); Liqing Zhang, Ottawa (CA)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 15/871,529

(22) Filed: Jan. 15, 2018

(65) Prior Publication Data

US 2018/0206262 A1    Jul. 19, 2018

Related U.S. Application Data

(60) Provisional application No. 62/447,865, filed on Jan. 18, 2017.

(51) Int. Cl.

| | | |
|---|---|---|
| *H04W 72/12* | (2009.01) | |
| *H04W 48/16* | (2009.01) | |
| *H04W 76/28* | (2018.01) | |
| *H04W 74/08* | (2009.01) | |
| *H04W 56/00* | (2009.01) | |

(Continued)

(52) U.S. Cl.
CPC ....... *H04W 72/1268* (2013.01); *H04W 48/16* (2013.01); *H04W 56/0005* (2013.01); *H04W 56/0045* (2013.01); *H04W 72/121* (2013.01); *H04W 74/0833* (2013.01);

(Continued)

(58) Field of Classification Search
None
See application file for complete search history.

(56) References Cited

U.S. PATENT DOCUMENTS

| | | | |
|---|---|---|---|
| 9,781,744 B1* | 10/2017 | Tenny | H04W 74/04 |
| 2012/0113939 A1* | 5/2012 | Kim | H04W 74/006 |
| | | | 370/329 |

(Continued)

FOREIGN PATENT DOCUMENTS

| | | |
|---|---|---|
| CN | 101540634 A | 9/2009 |
| CN | 103685119 A | 3/2014 |

(Continued)

OTHER PUBLICATIONS

3GPP TSG RAN WG2 Meeting #95bis R2-166059,"Transmission of Data Grant-Free in New State",Sierra Wireless, Oct. 10-14, 2016,total 8 pages.

(Continued)

*Primary Examiner* — Gregory B Sefcheck
*Assistant Examiner* — Suk Jin Kang

(57) ABSTRACT

A user equipment in a wireless communication system may operate in different states, e.g. an idle state, an active/connected state, or an inactive state. Depending upon the state the UE is in, the UE may or may not have its uplink transmission synchronized with the uplink transmissions of other UEs. Mechanisms are disclosed for the UE to send a grant-free uplink transmission, even when the UE does not have its uplink transmission synchronized with the uplink transmissions from other UEs.

10 Claims, 13 Drawing Sheets

(51) Int. Cl.
*H04W 72/04* (2009.01)
*H04W 28/02* (2009.01)

(52) U.S. Cl.
CPC ........ *H04W 76/28* (2018.02); *H04W 28/0215* (2013.01); *H04W 72/0413* (2013.01); *H04W 74/0891* (2013.01)

(56) References Cited

U.S. PATENT DOCUMENTS

| | | |
|---|---|---|
| 2012/0250520 A1 | 10/2012 | Chen et al. |
| 2013/0195084 A1 | 8/2013 | Chen et al. |
| 2014/0192767 A1* | 7/2014 | Au .................... H04W 72/0413 370/330 |
| 2014/0254544 A1* | 9/2014 | Kar Kin Au ......... H04L 5/0033 370/330 |
| 2015/0334762 A1* | 11/2015 | Yang .................... H04W 76/15 370/329 |
| 2015/0350945 A1* | 12/2015 | Chae .................... H04L 5/0057 370/252 |
| 2016/0013895 A1* | 1/2016 | Bae ...................... H04L 1/1845 370/328 |
| 2016/0255654 A1* | 9/2016 | Lin ....................... H04W 74/08 370/329 |
| 2017/0034845 A1* | 2/2017 | Liu ........................ H04L 1/0003 |
| 2017/0201958 A1* | 7/2017 | He ........................ H04W 56/00 |
| 2017/0318604 A1* | 11/2017 | Liu ........................ H04L 1/0003 |
| 2017/0367058 A1* | 12/2017 | Pelletier ............ H04W 56/0045 |
| 2017/0367110 A1* | 12/2017 | Li ...................... H04W 74/0816 |
| 2018/0035406 A1* | 2/2018 | Hao ...................... H04L 5/0046 |
| 2018/0049239 A1* | 2/2018 | Tenny .................. H04W 74/04 |
| 2018/0092125 A1* | 3/2018 | Sun ...................... H04W 74/02 |
| 2018/0109366 A1 | 4/2018 | Wu et al. |
| 2018/0124626 A1* | 5/2018 | Tsai ...................... H04W 24/06 |
| 2018/0152907 A1* | 5/2018 | Zhang ................. H04W 74/006 |
| 2018/0183645 A1* | 6/2018 | Meng .................. H04J 11/0076 |
| 2018/0198646 A1* | 7/2018 | Gau .......................... H04L 5/00 |
| 2018/0278377 A1* | 9/2018 | Bae ...................... H04L 1/1812 |
| 2019/0014548 A1* | 1/2019 | Pelletier ............ H04W 56/0045 |
| 2019/0052442 A1* | 2/2019 | Kim ........................ H04L 67/12 |
| 2019/0124615 A1* | 4/2019 | He ........................ H04W 24/02 |
| 2019/0132084 A1* | 5/2019 | Zhang ................. H04J 11/0026 |
| 2019/0166620 A1* | 5/2019 | Yasukawa ............. H04W 88/02 |
| 2019/0245640 A1* | 8/2019 | Yoshimoto .............. H04J 13/18 |
| 2019/0253281 A1* | 8/2019 | Gau ....................... H04L 5/0007 |
| 2019/0342848 A1* | 11/2019 | Zhang ................. H04B 7/0421 |
| 2020/0059935 A1* | 2/2020 | Qian ..................... H04W 74/02 |
| 2020/0221480 A1* | 7/2020 | Li ......................... H04W 74/08 |

FOREIGN PATENT DOCUMENTS

| | | |
|---|---|---|
| CN | 104081708 A | 10/2014 |
| WO | 2016201701 A1 | 12/2016 |
| WO | 2017000233 A1 | 1/2017 |
| WO | WO-2018031620 A1 * | 2/2018 ........... H04L 5/0053 |

OTHER PUBLICATIONS

3GPP TSG-RAN WG1 #86bis R1-1609737,"Random access principles for new radio",Nokia, Alcatel-Lucent Shanghai Bell, Oct. 10-14, 2016,total 3 pages.

3GPP TSG-RAN WG1 AH_NR Meeting R1-1700652,"On 2-step Random Access Procedure",Nokia, Alcatel-Lucent Shanghai Bell, Jan. 16-20, 2017,total 5 pages.

3GPP TSG-RAN WG1 #87 R1-1612299,"Random access principles for new radio",Nokia, Alcatel-Lucent Shanghai Bell, Nov. 14-18, 2016,total 4 pages.

3GPP TSG RAN WG2 Meeting #96 R2-168595,"Transmission of Data Grant-Free in Inactive State",Sierra Wireless, Nov. 14-18, 2016,total 10 pages.

Samsung: "Basic channel structure for grant-free based multiple access", 3GPP Draft; R1-1612572, vol. RAN WG1, No. Reno, Nevada, USA; Nov. 14-18, 2016, Nov. 13, 2016, XP051176517, 4 pages.

* cited by examiner

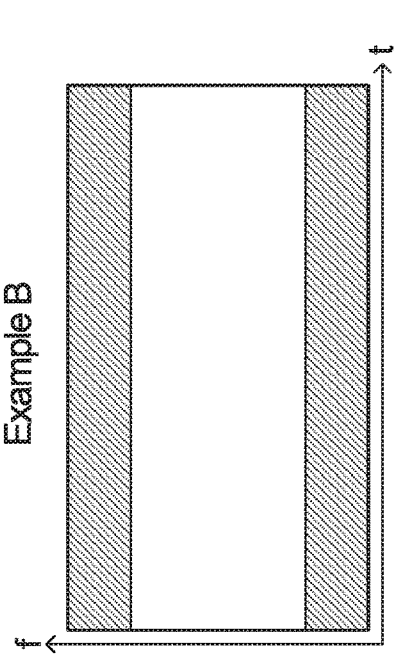
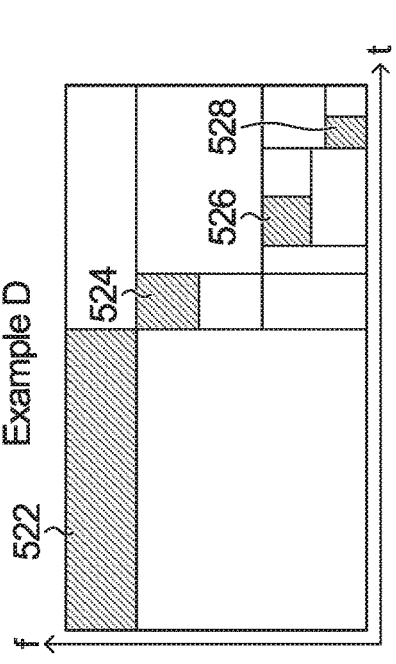
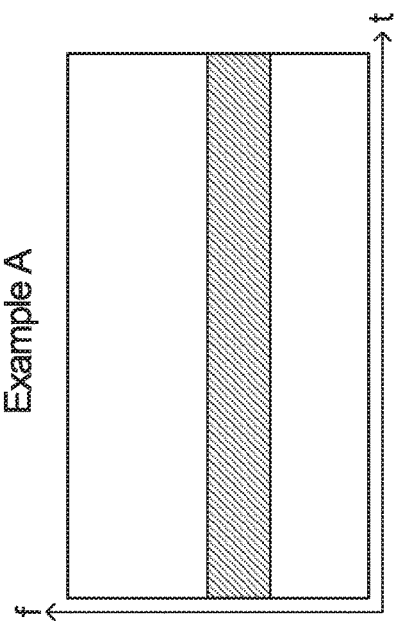
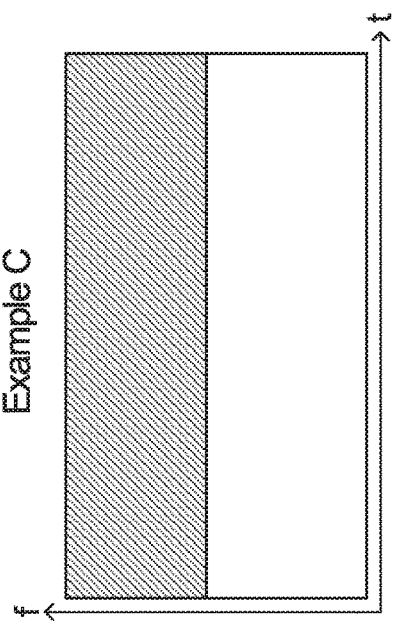
FIG. 12

SYSTEMS AND METHODS FOR ASYNCHRONOUS GRANT-FREE ACCESS

PRIORITY

The present application claims priority to U.S. Provisional Patent Application Ser. No. 62/447,865, entitled "Systems and Methods for Asynchronous Grant-Free Access", which was filed on Jan. 18, 2017, and which is incorporated herein by reference.

FIELD

The present application relates to grant-free uplink transmissions in a wireless communication system.

BACKGROUND

In some wireless communication systems, user equipments (UEs) wirelessly communicate with a base station to send data to the base station and/or receive data from the base station. A wireless communication from a UE to a base station is referred to as an uplink communication. A wireless communication from a base station to a UE is referred to as a downlink communication.

Resources are required to perform uplink and downlink communications. For example, a UE may wirelessly transmit data to a base station in an uplink transmission at a particular frequency and/or during a particular slot in time. The frequency and time slot used are examples of resources.

Some wireless communication systems may support grant-free uplink transmissions. That is, a UE may send uplink transmissions using certain uplink resources possibly shared with other UEs, without specifically requesting use of the resources and/or without specifically being granted the resources by the base station. A grant-free uplink transmission does not need a dynamic and explicit scheduling grant from the base station.

SUMMARY

When the uplink transmissions of a UE are synchronized with the uplink transmissions of other UEs, then the UE is said to be operating in a synchronized state. Mechanisms are disclosed herein for grant-free uplink transmission, even when the UE is not operating in a synchronized state.

Also, sometimes the long term evolution (LTE) random access channel (RACH) based preamble, which is used for timing estimation at the base station, may not be well suited for channel estimation and/or may occupy more resources compared to an uplink pilot (or uplink reference signal or uplink demodulation reference signal). Therefore, in some embodiments, there is provided an enhanced pilot/reference signal scheme for UE activity detection and channel estimation, as well as for transmission timing estimation by the base station. For example, the same reference signal may be used by the base station both to act like a preamble (for timing advance estimation) and for channel estimation. The resource utilization may be more efficient than the LTE RACH preamble. In some embodiments, the pilot/reference signal and data are transmitted together in a same resource area with frequency division multiplexing (FDM) and/or time division multiplexing (TDM).

In one embodiment, there is provided a method performed by a UE. The method includes transmitting an initial grant-free uplink transmission to a base station. The initial grant-free uplink transmission may include a reference signal. The method may further include receiving a timing advance value from the base station. The method may further include transmitting a subsequent grant-free uplink transmission, including applying the timing advance value so that the subsequent grant-free uplink transmission is synchronized with uplink transmissions of other UEs. A UE configured to perform the UE methods herein is also disclosed.

In another embodiment, there is provided a method performed by a base station. The method includes receiving a grant-free uplink transmission from a UE. The grant-free uplink transmission may include a reference signal. The method may further include performing timing advance estimation using the reference signal to obtain a timing advance value. The method may further include performing channel estimation using the reference signal. The method may further include transmitting the timing advance value to the UE. A base station configured to perform the base station methods herein is also disclosed.

BRIEF DESCRIPTION OF THE DRAWINGS

Embodiments will be described, by way of example only, with reference to the accompanying figures wherein:

FIGS. 11 to 13 illustrate examples of reference signals in subframes.

DETAILED DESCRIPTION

For illustrative purposes, specific example embodiments will now be explained in greater detail below in conjunction with the figures.

Figure 1:
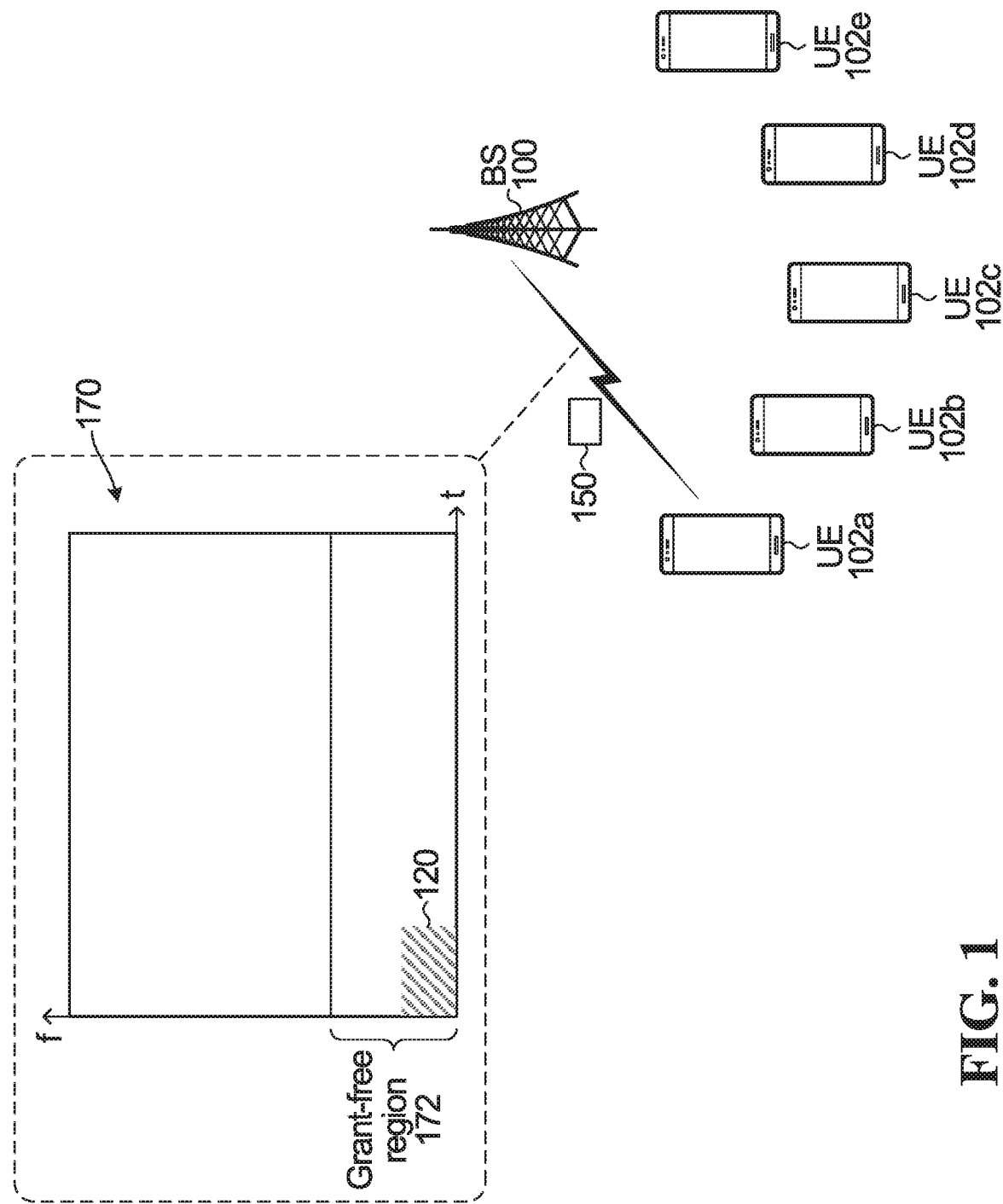
FIG. 1 is a block diagram of a base station and a plurality of UEs, according to one embodiment.

FIG. 1 is a block diagram of a base station 100 and a plurality of UEs 102a-e in a radio access network, according to one embodiment.

The word "base station" encompasses any device that wirelessly receives data in the uplink from wireless devices, such as UEs 102a-e. The base station 100 is an example of a network access device that provides network access to UEs 102a-e and as such, is generally meant to be representative of other types of access devices including a transmit and receive point, a base transceiver station, a radio base station, a radio access node, a network node, a transmit/receive node, a Node B, an eNode B (eNB), a gNB (sometimes called a "gigabit" Node B), a relay station, a remote radio head, or an Access Point (AP). Also, in some embodiments, the parts of the base station 100 may be distributed. For example, some of the modules of the base station 100 may be located remote from the equipment housing the antennas of the base station 100, and may be coupled to the equipment housing the antennas over a communication link (not shown). Therefore, in some embodiments, the term base station 100 may also refer to modules on the network side that perform processing operations (e.g. message decoding and message generation) that are not necessarily part of the equipment housing the antennas of the base station 100. The modules may also be coupled to other base stations. In some embodiments, the base station 100 may actually be a plurality of base stations that are operating together to serve the UEs 102a-e, e.g. through coordinated multipoint transmissions. Similarly, UEs 102a-e are also meant to be illustrative of other end user devices which may be configured as disclosed herein for uplink communications with the base station 100. Examples of other user devices include wireless transmit/receive units (WTRUs), mobile stations, wireless devices, fixed or mobile subscriber units, cellular telephones, personal digital assistants (PDAs), smart phones, laptops, computers, touchpads, wireless sensors, and consumer electronics devices.

FIG. 1 illustrates an example message 150 sent by UE 102a in a grant-free uplink transmission. Uplink transmissions from the UEs 102a-e, such as message 150, may be performed on a set of time-frequency resources. An example of a set of time-frequency resources 170 is shown in FIG. 1. The time-frequency resources 170 may be used to wirelessly communicate a series of OFDM symbols. Message 150 is transmitted via a grant-free uplink transmission at time-frequency region 120. Time-frequency region 120 is illustrated as being part of a grant-free region 172, but this is only an example. There may not be a dedicated grant-free region.

Grant-free uplink transmissions are sometimes called "grant-less". "schedule free", or "schedule-less" transmissions. Grant-free uplink transmissions from different UEs 102a-e may be transmitted using the same designated resources, in which case the grant-free uplink transmissions are contention-based transmissions. One or more base stations, e.g. base station 100, may perform blind detection on the grant-free uplink transmissions.

Grant-free uplink transmissions may be suitable for transmitting bursty traffic with short packets from the UEs 102a-e to the base station 100, and/or for transmitting data to the base station 100 in real-time or with low-latency. Examples of applications in which a grant-free uplink transmission scheme may be utilized include: massive machine type communication (m-MTC), ultra-reliable low latency communications (URLLC), smart electric meters, teleprotection in smart grids, and autonomous driving. However, grant-free uplink transmission schemes are not limited to the applications described above.

Figure 2:
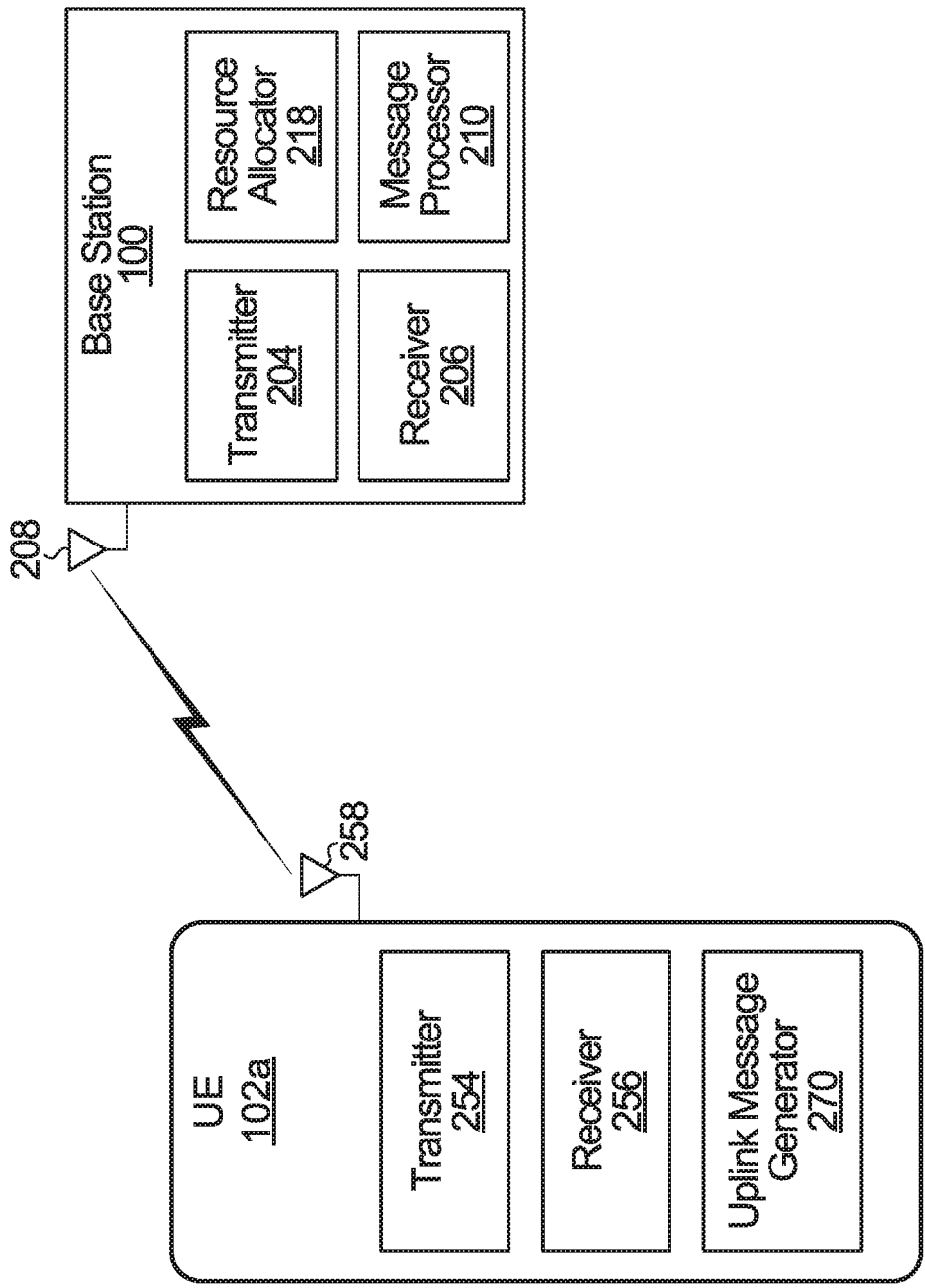
FIG. 2 is a block diagram showing the base station and a UE of FIG. 1 in more detail.

FIG. 2 is a block diagram showing the base station 100 and UE 102a of FIG. 1 in more detail. The base station 100 includes a transmitter 204 and a receiver 206 coupled to one or more antennas 208. Only one antenna 208 is illustrated. The transmitter 204 and the receiver 206 may be integrated as a transceiver. The base station 100 further includes an uplink message processor 210 for processing uplink transmissions from the UEs, e.g. for performing activity detection, channel estimation, and data decoding, and for performing timing advance estimation. The message processor 210 may be part of the receiver 206. The base station 100 further includes a resource allocator 218, which may perform operations such as generating scheduling grants, and/or determining which resources will be allocated as grant-free and/or grant-based resources, and/or configuring resources to be used for uplink transmissions in a synchronized state and/or unsynchronized state.

The message processor 210, the resource allocator 218, and/or any signal processing components of the transmitter 204 and receiver 206, may be implemented in the form of circuitry configured to perform the functions of the message processor 210, the resource allocator 218, and/or the transmitter 204/receiver 206. In some implementations the circuitry includes a memory and one or more processors that execute instructions stored in the memory that cause the one or more processors to perform the operations of the message processor 210, the resource allocator 218, and/or the transmitter 204/receiver 206. Alternatively, the message processor 210, the resource allocator 218, and/or any signal processing components of the transmitter 204 and receiver 206, may be implemented using dedicated integrated circuitry, such as an application specific integrated circuit (ASIC), a graphics processing unit (GPU), or a programmed field programmable gate array (FPGA) for performing the operations of the message processor 210, the resource allocator 218, and/or the transmitter 204/receiver 206. In yet other implementations, the functionality of the base station 100 described herein may be fully or partially implemented in software or modules stored in the memory and executed by the processor(s).

The UE 102a also includes a transmitter 254 and a receiver 256 coupled to one or more antennas 258. Only one antenna 258 is illustrated. The transmitter 254 and the receiver 256 may be integrated as a transceiver. The UE 102a further includes an uplink message generator 270 for generating messages to be transmitted in grant-based and/or grant-free uplink transmissions. Generating the uplink messages may include encoding and modulating the data to be transmitted in the message, and may include applying timing adjustment.

The uplink message generator 270 and/or any signal processing components of the transmitter 254 and receiver 256, may be implemented in the form of circuitry configured to perform the functions of the message generator 270, the transmitter 254 and/or receiver 256. In some implementations the circuitry includes a memory and one or more processors that execute instructions stored in the memory that cause the one or more processors to perform the operations of the message generator 270, and/or the transmitter 254/receiver 256. Alternatively, message generator 270, and/or any signal processing components of the transmitter 254 and receiver 256, may be implemented using dedicated integrated circuitry, such as an ASIC, a GPU, or an FPGA for performing the operations of the message generator 270, and/or the transmitter 254/receiver 256. In yet other implementations, the functionality of the UE 102a described herein may be fully or partially implemented in software or modules stored in the memory and executed by the processor(s).

The UEs 102b-e are not shown in detail in the figures, but UEs 102b-e have the same components as UE 102a illustrated in FIG. 2.

Returning to FIG. 1. UE 102a-e are each able to send grant-free uplink transmissions to base station 100. For example, message 150 is illustrated as being transmitted by UE 102a via a grant-free uplink transmission.

UE 102a is said to be synchronized to the system, i.e. operating in a synchronized state, when uplink transmissions from UE 102a are time adjusted to arrive at the base station 100 at the same time as the uplink transmissions of other UEs. Synchronization is achieved by the UE 102a using timing advance signaling. A timing advance is a negative offset, applied by the UE 102a, between the start of a received downlink transmission (e.g. downlink subframe) and the start of an uplink transmission (e.g. an uplink subframe) sent by UE 102a. A timing advance value may be estimated at the base station 100 based on one or more of an uplink preamble transmission, reference signal, and an uplink data transmission. The timing advance value is sent to the UE 102a, for use by UE 102a.

If the UE 102a is not operating in a synchronized state (e.g. no timing advance is being applied by the UE 102a to try to have uplink transmissions from UE 102a arrive at the base station 100 at the same time as the uplink transmissions of other UEs, or the timing advance command/value received by the UE has expired), then the UE 102a is said to be operating in an unsynchronized state. A timing advance value may be consider expired after a predetermined time window if no new timing advance value is received during the time window. The time window can be implemented, for example, through using a time alignment timer. The time alignment timer can be signaled by the base station when the timing advance signal is sent, or it can be configured in other signals, such as broadcast signaling (e.g. through system information) or RRC signaling. The timer may be used to control how long the UE is to consider uplink timing to be aligned (or in synchronized state) after the timing advance value is received. When the time alignment timer runs out after receiving a timing advance value, and if no new timing advance signal is received, the UE may not be able to use the previous timing advance value and may consider itself as no longer in a synchronized state. If a new timing advance value is received before the timer runs out, the timer is reset.

When the UE 102a is operating in an unsynchronized state, if an uplink transmission from the UE 102a happens to be synchronized with the uplink transmission of one or more other UEs, then it is a coincidence because the UE 102a is not intentionally applying a timing adjustment to try to cause the synchronization. Also, as mentioned above, in some embodiments a UE applying a timing adjustment value may be considered as operating in an unsynchronized state if the UE has not received an updated timing adjustment value from the base station for a particular duration of time, i.e. if the timing adjustment value being applied has become "stale" because the timer has run out/expired with no new/updated timing adjustment value received.

To synchronize with the base station, a UE can perform downlink synchronization, i.e, estimate the start of a received downlink subframe or frame, by detecting a downlink synchronization signal. A downlink synchronization signal may be broadcasted to every UE by the base station. The UE may also estimate or determine the start of a received downlink subframe or frame from any downlink transmission (data, control or reference signal). Due to different propagation delays from different UEs, in order to make sure the reception of the start of an uplink subframe from all UEs arrives at the base station at the same time, a UE may apply a timing advance value with respect to their downlink subframe arrival timing as a reference to calculate the uplink subframe timing. The timing advance value for a UE is approximately equal to two times the propagation delay, assuming the same propagation delay values for both downlink and uplink transmission. By applying the timing advance value as a negative offset from the transmission of the start of the uplink subframe with respect to the reception of the start of a downlink subframe, the uplink transmission from the UE may be ensured to arrive at the base station time aligned with the start of the transmission of a downlink subframe at the base station. Therefore, the reception of uplink subframes from all UEs at the base station may be aligned to avoid interferences due to timing misaligned from different UEs.

The concept of synchronized state and unsynchronized state refers to whether timing adjustment is being applied by UE 102a in order to synchronize arrival of the UE 102a's uplink transmission with that of other UEs. When in a synchronized state, the UE's uplink transmission is synchronized with uplink transmissions from other UEs. When in an unsynchronized state, the UE's uplink transmission is transmitted asynchronously with uplink transmissions from other UEs. Aside from this, UE 102a may operate in different states of operation, e.g. an idle state, or an active/connected state, or an inactive state, or an ECO state, etc. For example, in some embodiments, the UE 102a may operate according to a radio resource control (RRC) protocol. In such a RRC protocol, a UE may be in different states of operation. e.g. connected (e.g. RRC_CONNECTED), idle (e.g. RRC_IDLE), or inactive (e.g. RRC_INACTIVE). Depending upon the state of operation the UE 102a is in, UE 102a may or may not have its uplink transmission synchronized with the uplink transmissions of other UEs. For example, when UE 102a is operating in an idle state, then in general an uplink transmission sent by the UE 102a will not be synchronized with uplink transmissions from other UEs. That is, a UE in an idle state will typically also be in an unsynchronized state. However, when the UE 102a is operating in an active/connected state, then in general an uplink transmission sent by the UE 102a will be synchronized with uplink transmissions from other UEs. That is, a UE in an active/connected state will typically also be in a synchronized state. When the UE 102a is operating in an inactive state, then in some embodiments the UE 102a may or may not have its uplink transmissions synchronized with uplink transmissions from other UEs. That is, in some embodiments a UE in an inactive state may operate in an unsynchronized state or in a synchronized state, or switch between operating in an unsynchronized state and a synchronized state over time while remaining in the inactive state. As mentioned above, when the UE 102a is in a state in which its uplink transmissions are synchronized with other UEs, the UE 102a is said to be operating in the synchronized state.

The radio resource control (RRC) protocol is used for air interface of LTE and 5G new radio (NR) and other cellular wireless transmission systems. The functions of the RRC protocol include connection establishment and release functions, broadcast of system information, radio bearer establishment, reconfiguration and release, RRC connection mobility procedures, paging notification and release and outer loop power control. The operation of the RRC is guided by a state machine, which defines certain UE states that a UE may be present in. Different RRC states in the state machine have different radio resources associated with them, and the UE may use these resources in a given state. In an LTE network, there are two RRC UE states defined: idle state (e.g. RRC_IDLE) and connected state (RRC_CONNECTED). In idle state, the UE is typically not synchronized and cannot transmit data to the base station directly. In order to transmit data, the UE may perform an initial access procedure to establish a connection establishment and switch to connected state. The initial access typically starts with first sending a preamble to estimate uplink timing advance and request following resources. When the UE is in connected state, the UE is typically synchronized with the base station. The UE can switch to an idle state from the connected state through RRC release or detach. 5G NR also have both idle and connected states, similar to LTE. However, in 5G, a new state, inactive state (RRC_INACTIVE) is introduced as a state in between idle and connected state. The inactive state can be used to support low latency small packet transmission (e.g. for URLLC), support machine type communications (MTC) that transmit small packets, and/or power saving features etc. Some characteristics of RRC inactive state may include maintenance of context information by the UE similar to connected state, maintaining a core network (CN) connect or radio access network (RAN) connection etc. The UE can switch from RRC connected to RRC inactive state and vice versa. In inactive state, the UE may be allowed to perform uplink data transmission directly without switching to connected state first, such as to send small packet transmissions. When the UE is in inactive state, the UE may or may not be synchronized to the base station for uplink transmission. That is, the UE may or may not be in a synchronized state.

Embodiments below describe mechanisms for UE 102*a* to send a grant-free uplink transmission, even when not operating in a synchronized state.

In a previous LTE scheme, if the UE 102*a* is operating in an idle state, and therefore is not in a synchronized state, the UE 102*a* performs a random access process first before it can be scheduled for an uplink data transmission. As part of the random access process, the UE 102*a* sends an uplink transmission having a preamble that is used by the base station 100 to compute a timing advance value for the UE 102*a*. In LTE, the preamble is transmitted through the physical random access channel (PRACH). However, in some embodiments below, a reference signal is instead used by UE 102*a* for both channel estimation and timing advance computation. Therefore, in some embodiments, an initial transmission by UE 102*a* in an unsynchronized state includes a reference signal but not a preamble. A preamble is a specific pattern or sequence sent by the UE in the random access channel (RACH) process to be used to: i) estimate timing advance to achieve uplink synchronization, and ii) request resources for one or more subsequent uplink transmissions that the UE wishes to send. A preamble is typically not embedded inside the data transmission and is not used for channel estimation. However, in some embodiments below, a reference signal is sent, rather than a preamble, and the reference signal is used for both channel estimation and timing advance computation.

There are several potential advantages of using a reference signal (instead of the LTE preamble), along with data, for direct grant-free access in the unsynchronized state. First, in LTE, a UE not in a synchronized state has to first perform a multi-step random access process to re-establish a connection and/or timing synchronization before it can transmit any uplink data. This process may incur a significant amount of overhead as well as extra latency for data transmission. The direct access mechanism using a reference signal and data for direct grant-free transmission may significantly reduce the overhead and latency of the data transmission. In addition, a reference signal is an essential format of most data transmission and is used for channel estimation. Using it to double as a function of timing advance estimation may save extra overhead required for a different sequence (such as preamble) for timing advance estimation. Finally, using the reference signal for both channel estimation and timing advance estimation may help unify the data structure design for direct grant-free access in unsynchronized state or synchronized state.

Figure 3:
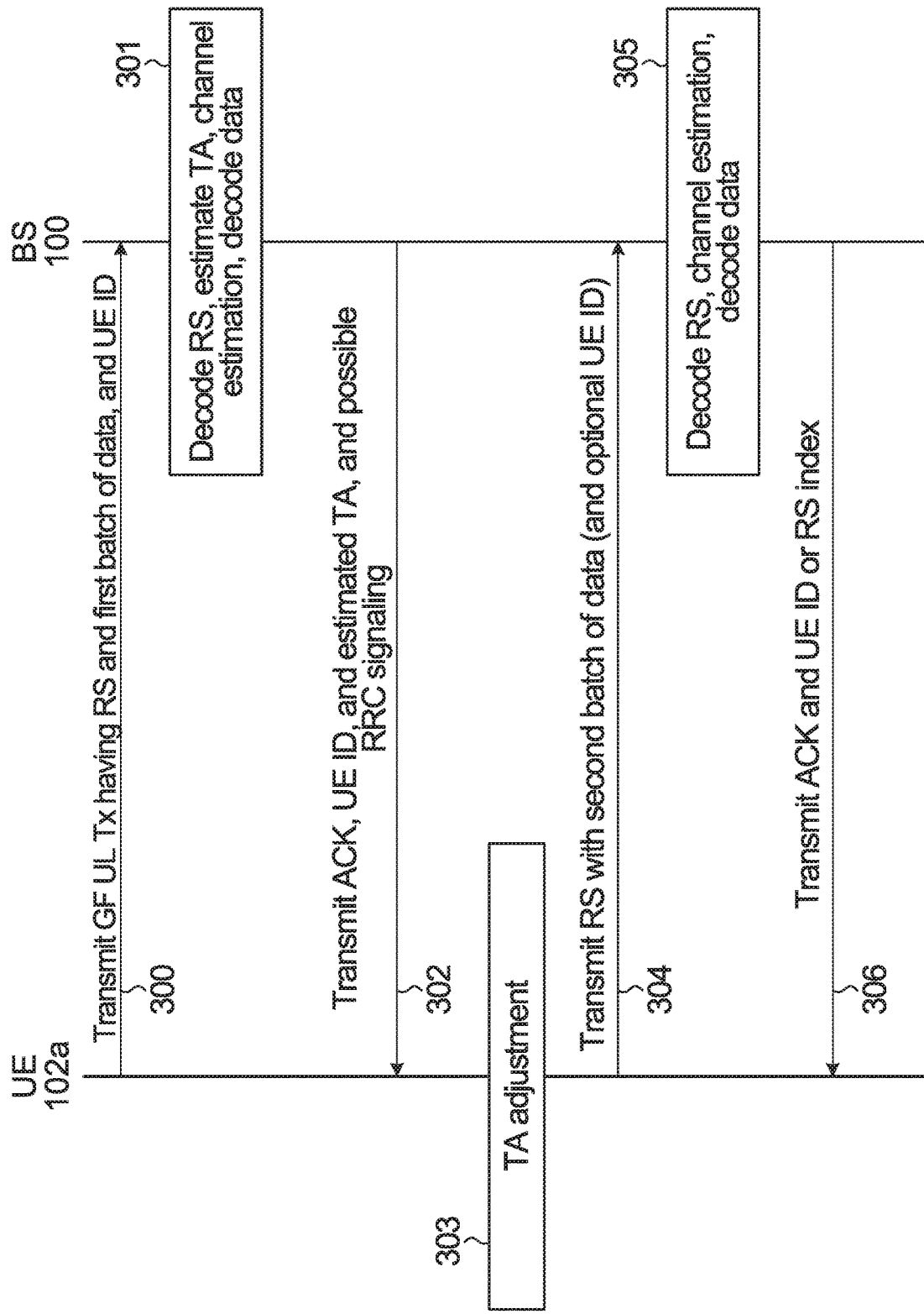
FIG. 3 is a flow chart of operations performed by a UE and base station, according to one embodiment.

FIG. 3 is a flow chart of operations performed by UE 102*a* and base station 100, according to one embodiment. The UE 102*a* is initially in an unsynchronized state, e.g. possibly due to not being in a connected state. However, UE 102*a* is able to send grant-free uplink transmissions before it changes to a synchronized state.

In step 300, UE 102*a* directly accesses the network by sending a grant-free uplink transmission to the base station 100. The grant-free uplink transmission includes a reference signal, a UE ID that identifies UE 102*a*, and a first batch of data to be sent to the network. As explained below, the reference signal is used for channel estimation, but also for timing advance estimation. The reference signal may be a demodulation reference signal (DMRS). In some embodiments, the reference signal may be randomly selected from a predefined reference signal pool by the UE 102*a*. This usually happens when the UE 102*a* has not been configured with a reference signal, as it is not in a connected state. In some embodiments, the reference signal parameters may be assigned earlier by the network. The assignment may be done through higher layer signalling. In some embodiments, a UE ID may not be needed if the reference signal uniquely identifies UE 102*a*, e.g. if only UE 102*a* uses the reference signal on the physical time and frequency resources. Therefore, the transmission of UE ID may be optional in step 300. The grant-free uplink transmission sent in step 300 may be message 150 in FIG. 1.

Figure 4:
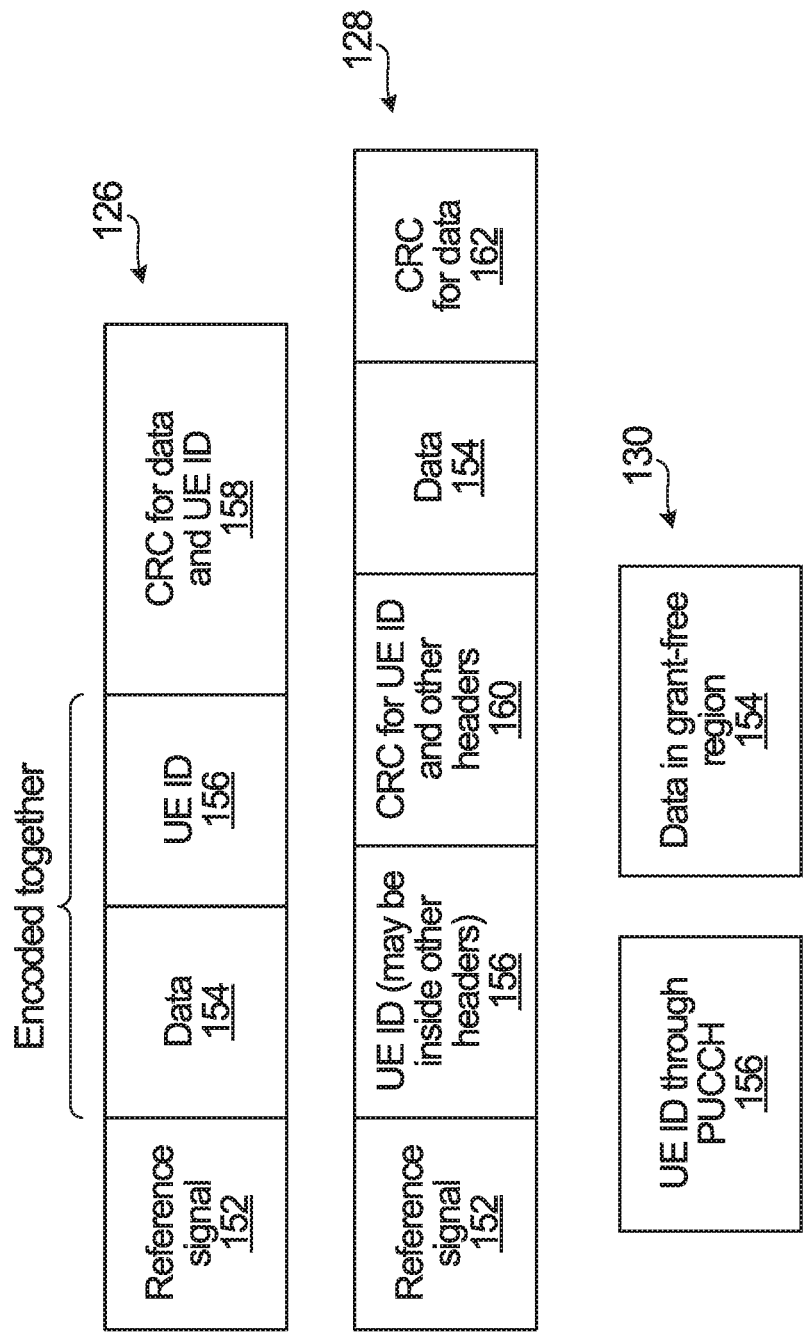
FIG. 4 illustrates example formats of a message sent in step 300 of FIG. 3.

Example formats of a message sent in step 300 are illustrated in FIG. 4. In example 126, the message includes reference signal 152, as well as the first batch of data 154, and the UE ID 156. The data 154 and the UE ID 156 are encoded together, and a corresponding cyclic redundancy check (CRC) 158 is generated and included in the message. In some embodiments, the UE ID 156 is instead embedded in the CRC 158, which may reduce the payload size. Example 128 is a variation of example 126 in which the UE ID 156 is separately encoded from the data 154. Therefore, a separate CRC 160 is associated with the UE ID 156. In some embodiments, the UE ID 156 may be inside one or more other headers, in which case the CRC 160 is for the headers in which the CRC 160 is located. In example 128, the UE ID 156 may be transmitted with a lower modulation and coding scheme (MCS) than the data 154 in order to facilitate decoding of the UE ID 156. There may be situations in which the UE ID 156 is successfully decoded, but the data 154 is not successfully decoded. Example 130 in FIG. 4 shows a variation in which the UE ID 156 and the data 154 are transmitted through different resources. For example, the UE ID 156 may be transmitted as part of a control channel, such as a physical uplink control channel (PUCCH). The data 154 may be transmitted in a grant-free region of an uplink data channel. The reference signal is not illustrated in example 130, but the reference signal would be part of the data transmission in block 154.

Returning to FIG. 3, in step 300, in some embodiments the transmission may be sent through a random access channel designed for direct grant-free access without synchronization, e.g. possibly similar to PRACH for random access in LTE. The resources for such grant-free access may be predefined in a broadcast channel or configured in a control channel. In some embodiments, the resources for UE 102*a*'s transmission in step 300 may be configured in higher layer signalling, such as RRC signalling.

In step 301, the base station 100 performs activity detection to decode the reference signal (RS). Activity detection is successfully performed when the reference signal is successfully decoded. Activity detection may involve correlating the reference signal received with all possible reference signal sequences, and selecting the one that gives the maximum energy. In embodiments in which the reference signal is already known by the base station 100, then activity detection is not needed. Once activity detection is successfully performed (assuming it is needed), the base station 100 then uses the reference signal to estimate the timing advance (TA) for UE 102*a*. There are many different methods to estimate timing advance, and the specific method used would be implementation specific. Estimating timing advance using the reference signal can be done similarly as the method of timing advance estimation using a preamble in LTE. For example, the timing advance estimation may be based on correlation of the received reference signal with the root reference signal sequence.

In one embodiment, the base station may perform the following operations to obtain a timing advance value from the received reference signal. The base station may select a known reference signal sequence, and apply a correlation of the known reference signal sequence with the received reference signal at different times. The base station determines at which time the output of the correlation provides the highest energy. The base station then uses this timing to estimate the start of a reference signal symbol. The base station then uses the start of the received reference signal as a reference to estimate the timing of the start of the received uplink subframes or slots or frames, and compare it to the timing of a downlink subframe/slots/frames to estimate the timing advance value.

The base station 100 also uses the reference signal to perform uplink channel estimation. That is, the same reference signal is used for both timing advance and channel estimation. Channel estimation may be performed as follows: the activity detection may output the most likely reference signal sequence that was used by UE 102a. The base station 100 may then use the most likely reference signal (from activity detection) and the transmitted reference signal to estimate the channel.

In one embodiment, activity detection may be performed as follows. The base station correlates the received reference signal with each potential reference signal sequence and determines which potential reference signal sequence provides the highest energy or provides an energy that is larger than a threshold after correlation with the received reference signal. The potential reference signal sequence yielding the largest energy value upon correlation is selected as the received reference signal, or each reference signal sequence that provides an energy larger than a threshold is considered to be a potential reference signal sequence.

In one embodiment, the channel estimation may be performed by the base station using minimum mean square error (MMSE) or anther technique. The received reference signal may be expressed as the transmitted reference signal multiplied by the channel and with the noise added. As the transmitted reference signal is known if the reference signal sequence is known, the base station can therefore estimate the value of the channel using the received reference signal and the transmitted reference signal.

Once the channel is estimated, the base station 100 attempts to decode the first batch of data based on the estimated channel.

Activity detection and decoding of the first batch of data is successful in FIG. 3. The base station 100 therefore knows the identity of UE 102a since its UE ID was included in the uplink message sent in step 300.

In step 302, the base station transmits an acknowledgement (ACK) to UE 102a, together with the UE ID corresponding to UE 102a, and together with the timing advance value for UE 102a that was computed in step 301. The transmission may be sent in a downlink data channel, such as a downlink shared channel (DL-SCH), and indicated on a downlink control channel (e.g. a physical downlink control channel (PDCCH)) using an identity reserved for the grant-free direct access (e.g. similar to RA-RNTI in LTE). The identity and process can be similar to the random access response in LTE. In some embodiments, the base station 100 may optionally send higher level signaling, such as radio resource control (RRC) signaling for an RRC connection setup, if needed. RRC signaling may include assigning grant-free resources to UE 102a that the UE 102a is to use when sending subsequent uplink transmissions in a synchronized state. The RRC signalling can be transmitted together with the ACK or through a separate transmission. The assigned grant-free resources may include at least one of: the time-frequency resources assignment and reference signal assignment. The grant-free resources assigned/configured in step 302 may be different from the resources configured for use in step 300. This is because the resources in step 302 are used for synchronized grant-free uplink transmission, whereas step 300 is used for grant-free uplink transmission in an unsynchronized state. In other embodiments, the grant-free resources configured to be used in step 302 may have overlap or be the same as the resource configured to be used in step 300.

The UE 102a receives the ACK and verifies that the received UE ID matches its own UE ID. The UE 102a therefore decides that its transmission sent in step 300 was successfully received and decoded. Therefore, in step 303, the UE 102a performs any needed uplink timing advance adjustment using the timing advance value it receives before further uplink transmissions, so that the further uplink transmissions are synchronized with the uplink transmissions of other UEs. The timing advance adjustment is similar to the timing advance adjustment used in LTE, for example, through shifting the uplink transmission/frame timing earlier by the value indicated by the timing advance signal. In one embodiment, the UE 102a applies the timing advance adjustment as follows (and as described earlier). The timing of a received downlink subframe or slot is used by the UE as a reference. The timing of the received downlink subframe or slot may be obtained through downlink synchronization. The UE then applies a negative offset to the start of its uplink transmission, where the negative offset is equal to the timing advance value received from the base station. The negative offset time may be used as the transmission time of the start of an uplink subframe or slot.

After step 303, the UE 102a is synchronized to the system. In step 304, UE 102a performs a grant-free uplink transmission carrying a second batch of data after TA adjustment. The uplink transmission in step 304 is synchronized with the uplink transmissions of other UEs.

The grant-free uplink transmission in step 304 may have the same format as the uplink transmission in step 300, e.g. a reference signal of the same and/or similar format may be used in steps 300 and 304. In some embodiments, the reference signal used in steps 300 and 304 may be the same reference signal, although this is not necessary. In other embodiments, the format of the reference signal sent in step 304 may be different from the format of the reference signal sent in step 300 because the reference signal sent in step 304 does not need to be used by the base station 100 to estimate a timing advance value. The reference signal used in step 304 may have been preconfigured by the network, for example, through the RRC signalling in step 302. In some other embodiments, in step 304, the UE 102a may randomly select a reference signal if the reference signal has not been configured by the network.

The transmission of UE ID is optional in step 304 if the reference signal used in step 304 can uniquely identify the UE 102a on the grant-free resources used by UE 102a.

The grant-free region used to send the grant-free uplink transmission in step 304 may or may not be the same as the grant-free region that was used to send the grant-free uplink transmission in step 300.

In step 305, the base station 100 performs the same grant-free detection procedure described above in relation to step 301, except that timing activity detection is not needed.

In FIG. 3, the activity detection and decoding of the second batch of data is successful in step 305, and so in step 306 the base station transmits an ACK to UE 102a. The ACK includes information to identify that the ACK is for the UE 102a. e.g. the ACK may include the UE ID or (if the reference signal uniquely identifies the UE) a reference signal index identifying the reference signal used by UE 102a in step 304. The successful receipt of the ACK by UE 102a indicates to UE 102a that a retransmission of the second batch of data is not needed.

In some embodiments, the base station may not need to send an ACK in step 306, in which case the UE may assume ACK if no HARQ feedback or retransmission grant is sent by the base station.

Figure 5:
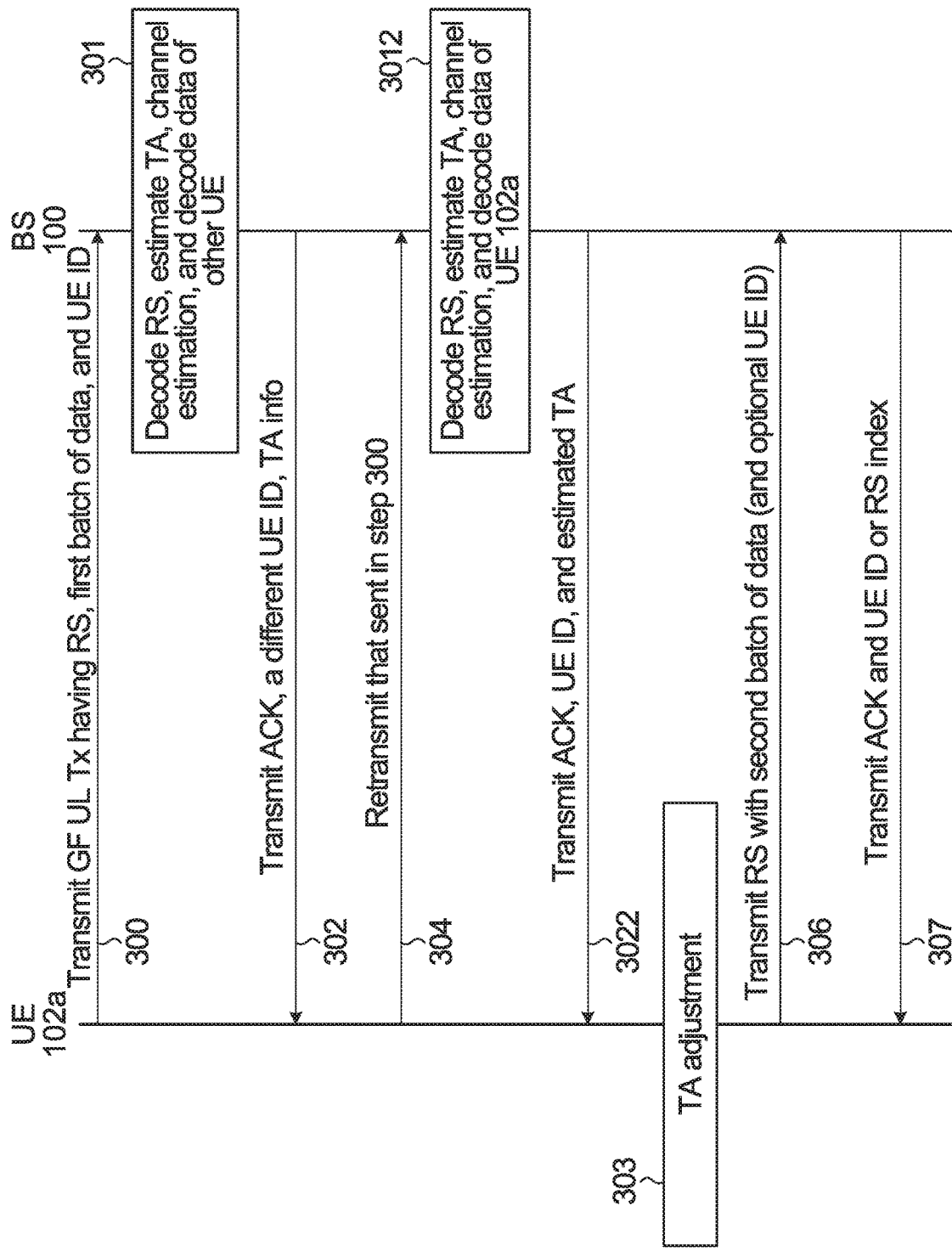
FIGS. 5 to 10 illustrate example operations performed by a UE and base station, according to other embodiments.

FIG. 5 illustrates a variation of FIG. 3 in which another UE also happens to be in an unsynchronized state and also happens to send an initial grant-free uplink transmission that collides with the grant-free uplink transmission sent by UE 102a in step 300.

With reference to FIG. 5, step 300 is the same as step 300 described above in relation to FIG. 3. In step 301, the base station successfully performs activity detection of the other UE (not UE 102a), estimates the timing advance (TA) for the other UE (not UE 102a), and successfully decodes the data of the other UE (not UE 102a). The message sent in step 302 therefore includes an ACK along with timing advance information and the UE ID of the other UE that had its data successfully decoded. UE 102a receives the ACK and UE ID sent in step 302, but cannot verify the UE ID because it is different from the UE ID of UE 102a. Therefore, UE 102a discards the timing advance information in the message sent in step 302. In step 304, UE 102a retransmits that sent in step 300. However, the retransmission in step 304 may use a different resource and/or a different reference signal. The retransmission data format may be the same as in step 300, as the UE 102a is still in unsynchronized state. In step 3012, the base station 100 is able to successfully perform activity detection for UE 102a, and use the reference signal to perform timing advance estimation and channel estimation. The base station 100 is also able to successfully decode the first batch of data sent by UE 102a. In step 3022, the base station 100 sends the ACK, UE ID, and estimated timing advance to UE 102a (i.e. the same as step 302 of FIG. 3). Step 3022 may also include RRC signalling as in step 302 of FIG. 3. Steps 303, 306, and 307 are the same as the last portion of FIG. 3, i.e. the UE 102a performs uplink timing advance adjustment and sends a subsequent uplink transmission (in step 306 of FIG. 5) that is synchronized to the system. The subsequent uplink transmission includes a reference signal, a second batch of data, and optionally the UE ID (e.g. if the reference signal does not uniquely identify the UE 102a). The subsequent uplink transmission is successfully decoded, and in step 307 of FIG. 5 the base station 100 feeds back an ACK that includes information uniquely identifying the UE 102a (e.g. the UE ID or a reference signal index). The feedback may be through a dedicated ACK/NACK channel, like the Physical HARQ Indicator Channel (PHICH) in LTE. The feedback may also or instead be transmitted in a downlink control channel, e.g. in a downlink control information (DCI) message.

Figure 6:
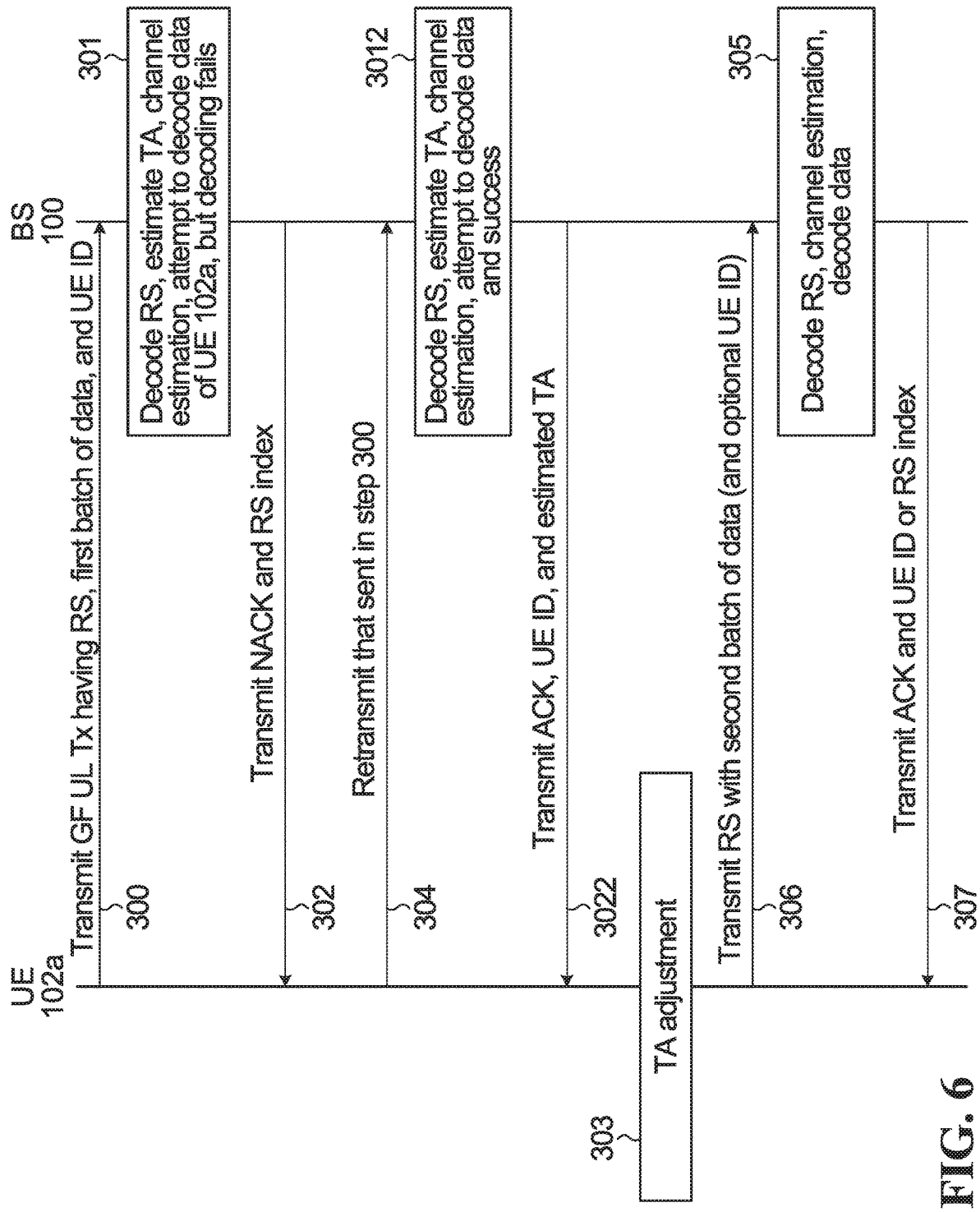

FIG. 6 is similar to FIG. 5, with the following notable change. In step 301 of FIG. 6, the base station 100 is able to successfully decode the reference signal sent by UE 102a in step 300 (i.e. activity detection is successful), but decoding of the first batch of data is unsuccessful. Therefore, in step 302, the base station sends a negative acknowledgment (NACK) to the UE 102a. The NACK is associated with an index identifying the reference signal used by UE 102a, which the UE 102a may use to decide that the NACK is in response to the transmission sent at step 300. The NACK may be sent in a dedicated ACK/NACK channel (like in LTE), with a similar method to associate the NACK with a reference signal index and the transmission location. In some other embodiments, the reference signal index may be sent in a separate field from the NACK. In some embodiments, the NACK may be sent through a DCI.

In some embodiments, the NACK sent in step 302 may instead include the UE ID for UE 102a if the base station 100 was able to successfully decode the UE ID in step 301. Alternatively, if in step 301 the base station 100 is unable to even successfully decode the reference signal (i.e. activity detection is not even successful), then in step 302 the NACK may be transmitted without a reference signal index and without a UE ID, or the NACK may not even be sent (i.e. no step 302). If the UE 102a receives a NACK not associated with a reference signal index or a UE ID, or if the UE 102a does not even receive a NACK (or ACK) within a predetermined period of time, then the UE 102a decides that decoding of its uplink transmission sent in step 300 was unsuccessful. Step 304, and the remaining steps of FIG. 6, are the same as FIG. 5.

Figure 7:
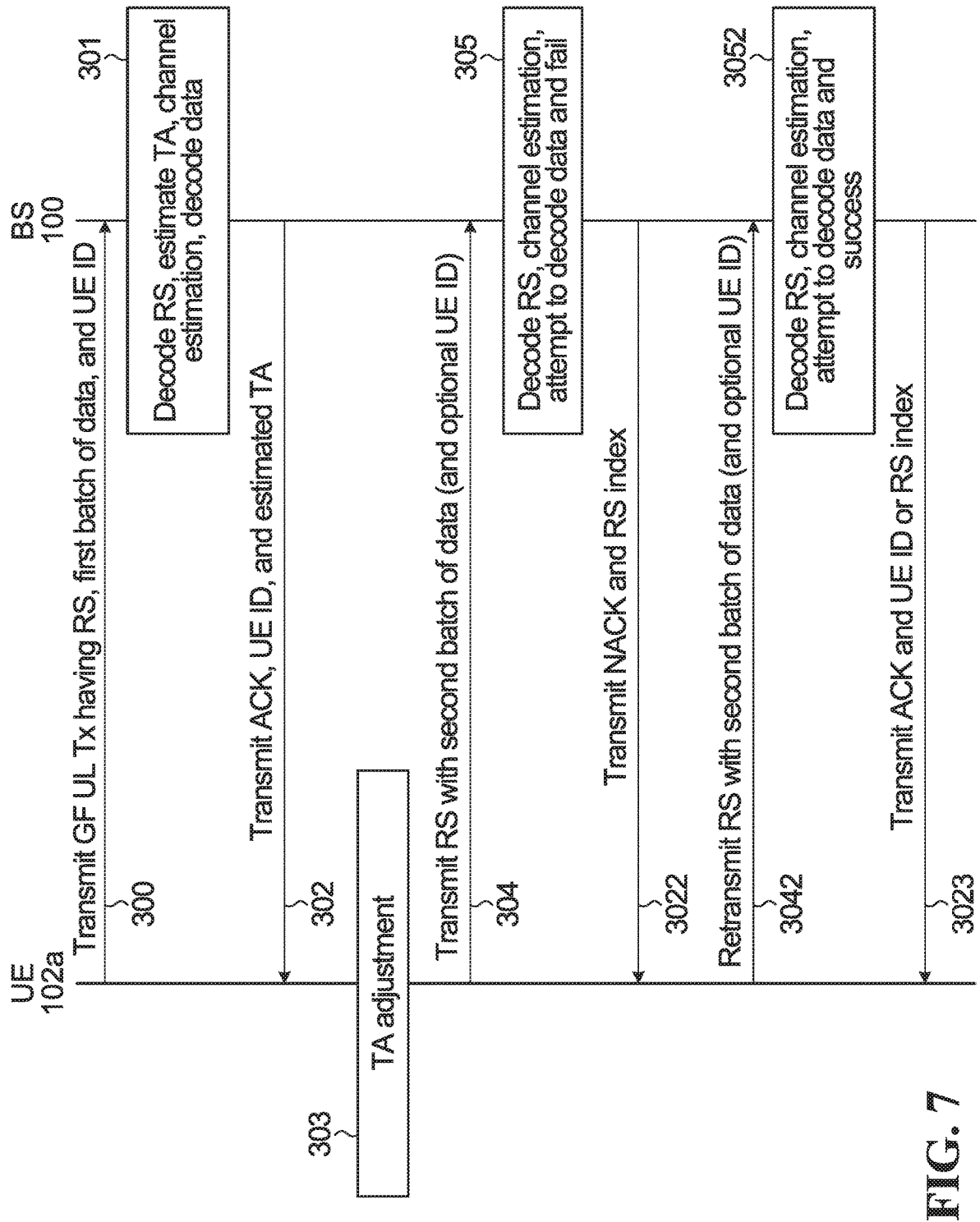

FIG. 7 illustrates an example in which retransmission is performed in a synchronized state. Steps 300 to 304 are the same as FIG. 3. In step 305 of FIG. 7, the base station 100 is able to successfully decode the reference signal sent in step 304, but is not able to successfully decode the second batch of data sent in step 304. Therefore, in step 3022, the base station 100 transmits a NACK and associated reference signal index identifying the reference signal used by UE 102a in step 304. Alternatively, the NACK may be associated with the UE ID for UE 102a instead, e.g. if the base station 100 was able to successfully decode the UE ID. In step 3042, the UE 102a sends a retransmission of the second batch of data with a reference signal and optionally with the UE ID of 102a if the reference signal does not uniquely identify UE 102a on the grant-free resources used by UE 102a. The retransmission may be performed using grant-free resources assigned to the UE 102a. In step 3052, the base station 100 successfully performs reference signal detection and data decoding. In step 3023, an ACK is sent to UE 102a. The ACK is associated with the UE ID for 102a or the reference signal index corresponding to the reference signal used by UE 102a in step 3042. The receipt of the ACK indicates to UE 102a that a further retransmission of the second batch of data is not needed. In some embodiments, UE 102a may not wait any period for the ACK/NACK, but instead UE 102a may send continuous retransmission of data sent in step 3042, until an ACK is received.

Figure 8:
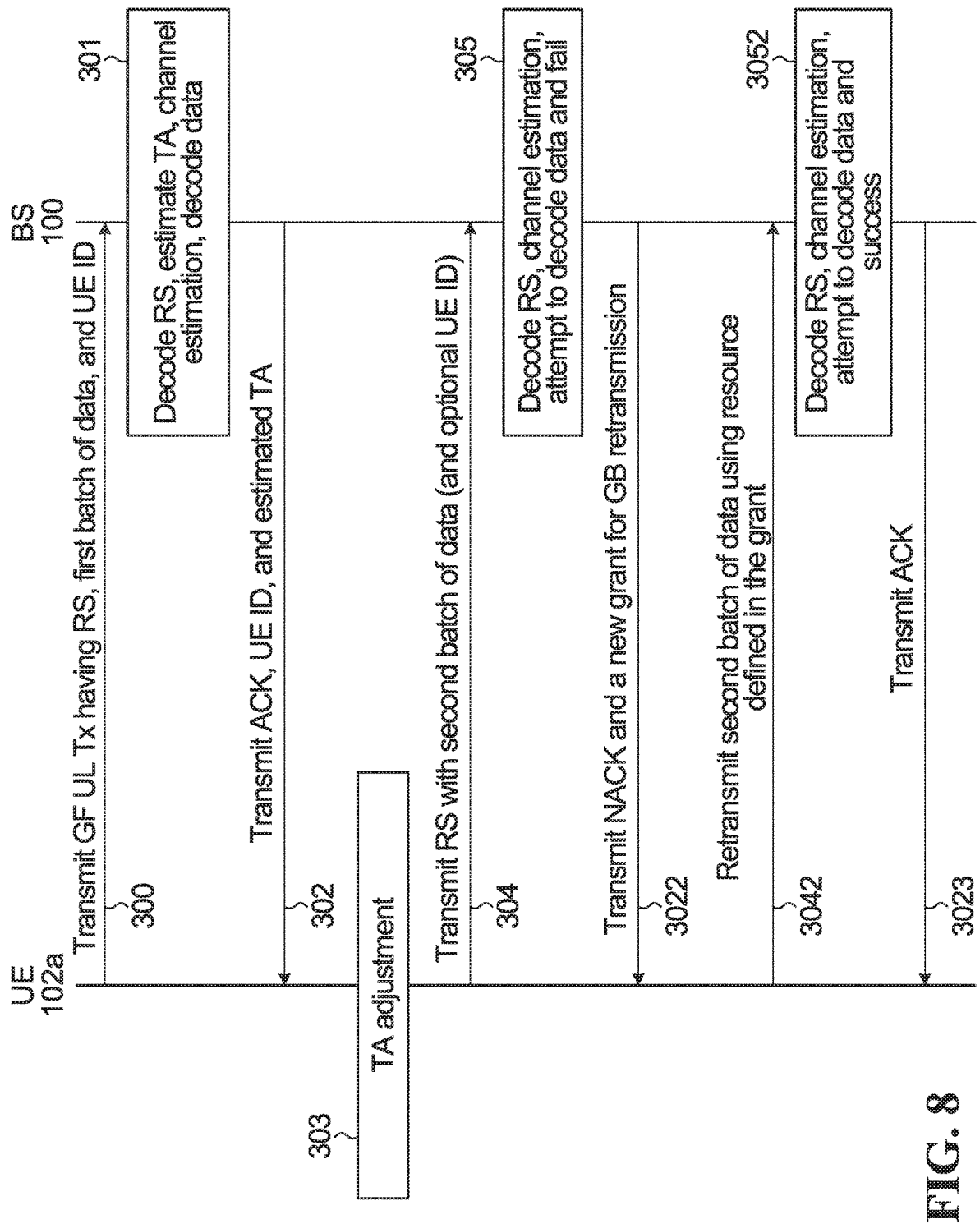

FIG. 8 illustrates another example in which retransmission is performed in a synchronized state. Steps 300 to 304 are the same as FIG. 3. In step 305 of FIG. 8, the base station is able to successfully decode the reference signal sent in step 304, but is not able to successfully decode the second batch of data sent in step 304. Therefore, in step 3022 the base station 100 transmits a NACK to the UE 102a, along with a new grant for sending a retransmission. That is, the UE 102a is switched from grant-free mode to grant-based mode in that the retransmission is sent using granted time-frequency resources. The grant identifies the resources and parameters to be used to send the retransmission. The NACK sent in step 3022 may be explicit or implicit. For example, the receipt of a grant to send a retransmission may implicitly mean a NACK, even if a NACK is not explicitly signalled. In step 3042, a retransmission relating to the unsuccessfully decoded second batch of data is sent on the granted resources. In step 3052, the base station 100 successfully performs reference signal detection and data decoding. In step 3023, an ACK is sent to UE 102a. The ACK may be sent in a dedicated ACK/NACK channel, such as PHICH or through DCI. The receipt of the ACK indicates to UE 102a that a further retransmission of the second batch of data is not needed. The ACK in step 3023 may be optional. For example, in some scenarios the base station does not send an ACK, in which case the UE may assume an ACK and not perform retransmission if no NACK or feedback is received at a predefined window.

Figure 9:
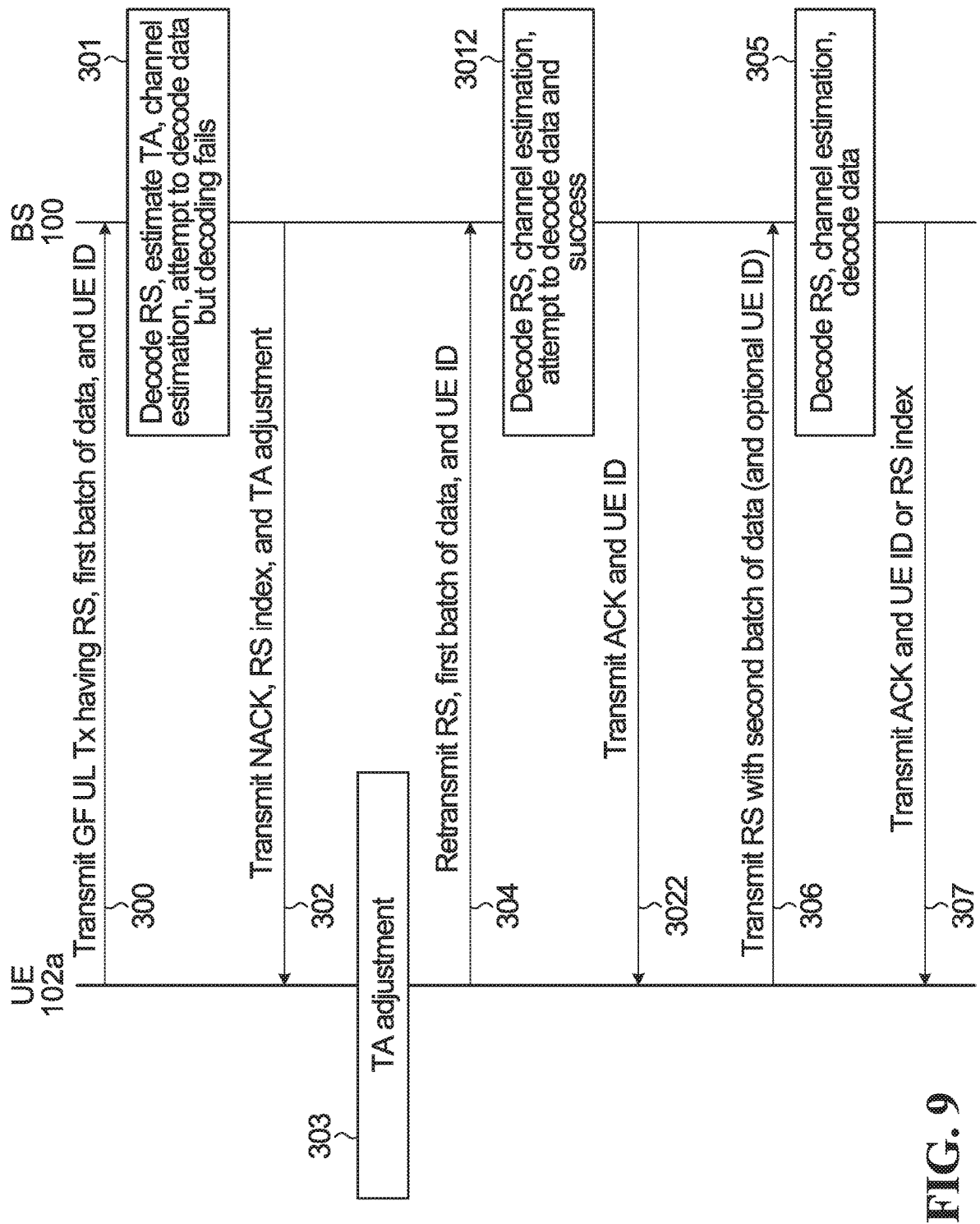

FIG. 9 illustrates an embodiment in which timing advance adjustment occurs before retransmission of the first batch of data. Step 300 is the same as FIG. 3. In step 301 of FIG. 9, the base station 100 successfully decodes the reference signal, estimates timing advance, and performs channel estimation, but decoding of the first batch of data fails. Therefore, in step 302 the base station 100 transmits a NACK with a reference signal index identifying the reference signal used in step 300, and with the timing advance value. The UE ID for UE 102a may be sent instead of the reference signal index in step 302 if the UE ID is successfully obtained by the base station 100. In step 303, the UE 102a performs any needed uplink timing advance adjustment using the timing advance value it receives before further uplink transmissions, so that the further uplink transmissions are synchronized with the uplink transmissions of other UEs. After step 303, the UE 102a is synchronized to the system.

In step 304, UE 102a performs a grant-free uplink transmission carrying a retransmission of the first batch of data. The reference signal used in step 304 may or may not be the same as the reference signal used in step 300. The message sent in step 304 includes the UE ID of UE 102a, although this is not necessary if the reference signal can be used to uniquely identify UE 102a. In step 3012, the decoding of the first batch of data is a success, and in step 3022 an ACK is transmitted back to UE 102a. As above, the ACK may be associated with the UE ID for UE 102a or a reference signal index. Steps 306, 305, and 307 are the same as FIG. 6.

Figure 10:
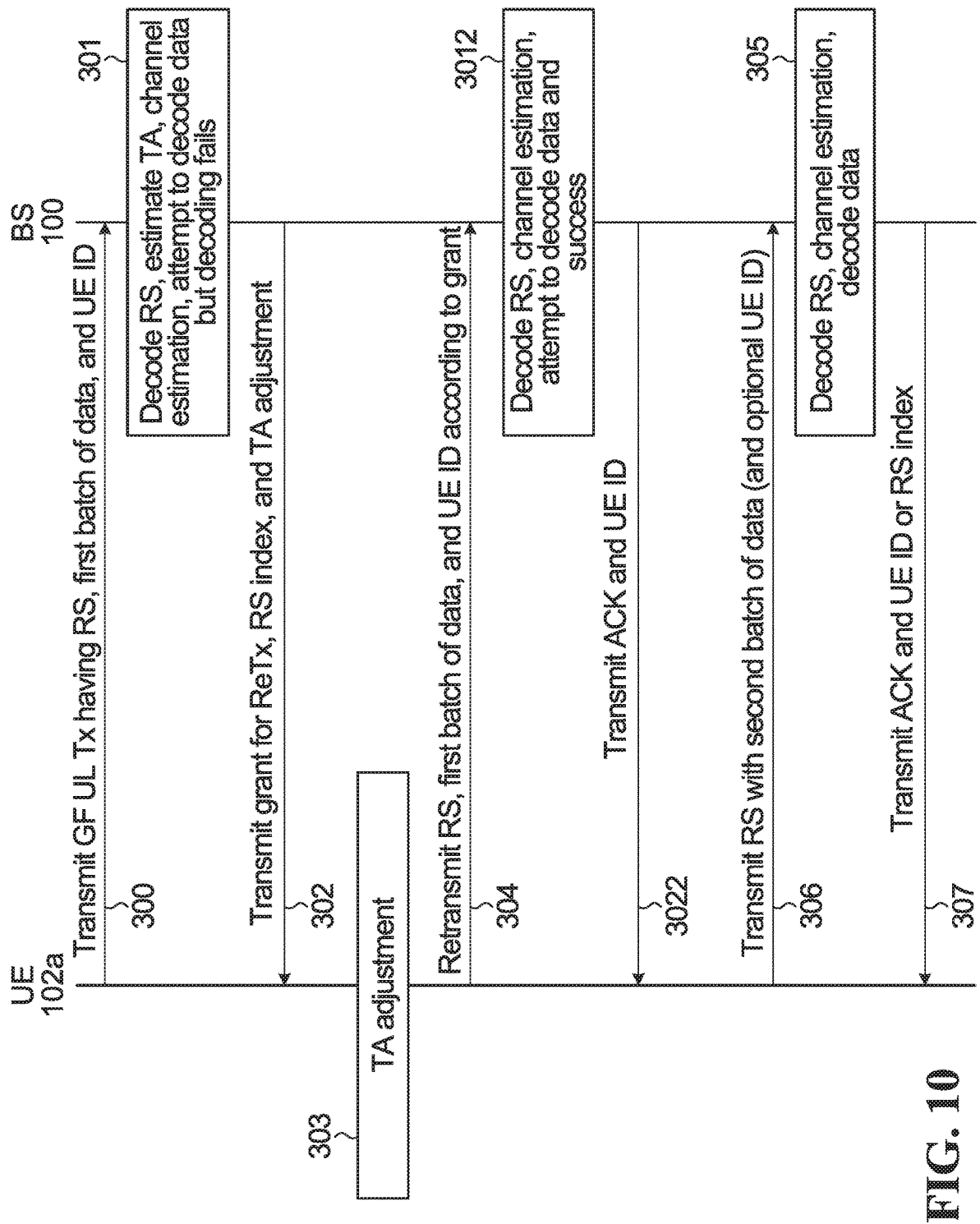

FIG. 10 illustrates another embodiment that is similar to FIG. 9, except the following notable difference: In step 302, a retransmission grant is sent instead of a NACK. The retransmission grant may include the TA adjustment information. The retransmission grant may also include the decoded RS index. The retransmission grant can be transmitted in a DCI in some embodiments. The retransmission grant may also include time and frequency resources and other transmission parameters (such as MCS) used for the retransmission. The retransmission grant may include a list of retransmission resources and parameters and/or TA adjustment, with each indexed by the RS index. In step 304, UE may retransmit the first batch of data using the resources specified in the retransmission grant in 302.

In all of the methods described in FIG. 3 to FIG. 10, the procedure of using a reference signal and data for direct grant-free access in an unsynchronized state, and adjusting timing before further grant-free transmissions after the response of the first transmission, may have many advantages. First, in LTE, a UE 102a not in a synchronized state has to first perform a multi-step random access process to re-establish a connection and/or timing synchronization before it can transmit any uplink data. This process may incur a significant amount of overhead as well as extra latency for data transmission. Whereas, in some embodiments described above, only two steps are needed for both the data transmission of the first packet and obtaining timing advance. After obtaining the timing advance, the UE can use the configuration in the second step as well as synchronization for a possibly more reliable and efficient transmission afterwards.

If a reference signal is to be used for both timing advance and channel estimation, e.g. as in FIGS. 3 to 10 above, then a new reference signal design may be beneficial. Previous demodulation reference signals were primarily used for channel estimation in synchronized state and/or were designed to have a low peak-to-average-power ratio (PAPR). For example, a demodulation reference signal in LTE may be designed to occupy the whole OFDM symbol across the frequency subcarriers in a subframe. Such a reference signal design may not be ideal for performing timing advance estimation, e.g. it may be better to have several time samples to estimate a timing advance value for a UE. Embodiments below disclose reference signal sequences that span across several time slots.

Figure 11:
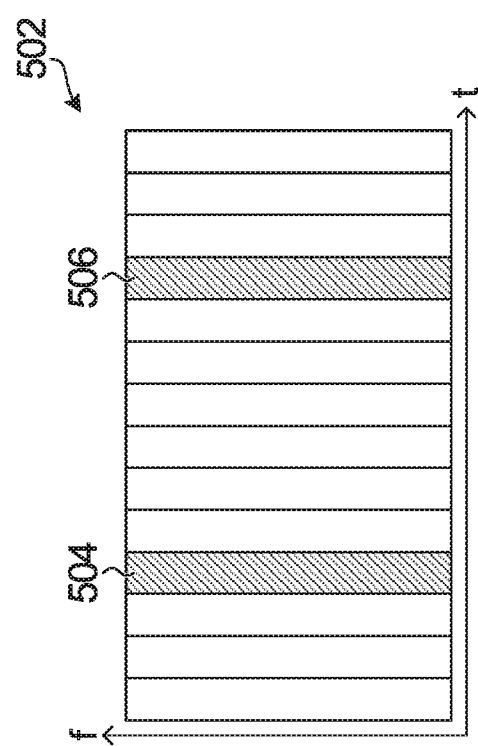

FIG. 11 illustrates a subframe 502 that has 14 OFDM symbols. There are two reference signals 504 and 506, which are shown in hatching. Reference signals 504 and 506 may not work as well for timing advance estimation because each reference signal does not span several time units. Alternative examples of reference signals are shown in FIG. 12. Each example in FIG. 12 shows a subframe (or portion of a subframe), with the reference signal(s) illustrated in hatching. Specific OFDM symbols are not shown in FIG. 12 because the designs apply to subframes of any number of OFDM symbols. For example, each subframe may have more or fewer than 14 OFDM symbols in some embodiments.

In Example A, the reference signal is the duration of the whole subframe, but the reference signal is only carried on a portion of the subcarriers. The reference signal may occupy a width in the frequency domain possibly as small as one frequency subcarrier. Example B is an example in which different reference signals are present at different frequency locations in the subframe. Each reference signal may occupy a width in the frequency domain possibly as small as one frequency carrier. Example C illustrates a reference signal having a duration of the whole subframe and spanning several frequency subcarriers in the frequency domain. Example D illustrates a first reference signal 522 having a duration of several OFDM symbols in the subframe (but not the whole subframe). The first reference signal 522 is primarily used for timing advance estimation, but it may also be used for channel estimation. Scattered reference signals 524, 526, and 528 are also present in other time-frequency locations in the subframe. Scattered reference signals 524, 526, and 528 are primarily used for channel estimation, but may also be used for timing advance estimation. Scattered reference signals may be especially helpful when used in combination with the reference signal in 522 for channel estimation when the channel changes fast in time and frequency domain. Example E illustrates an example in which the reference signal only occupies a beginning portion of a part of a subframe.

In some embodiments, two different reference signals may possibly be used with the data transmission: (1) a main reference signal, which will be referred to as "main pilot Pm", and (2) a secondary reference signal, which will be referred to as "secondary pilot Ps". The main pilot Pm may be primarily used for UE activity detection and channel estimation, e.g. for coverage of the frequency domain, perhaps like the pilots used in LTE. The main pilot Pm may be defined to occupy relatively few resources, especially when it is combined with the usage of the secondary pilot Ps. The secondary pilot Ps may be used for coverage of time domain (and frequency), and may primarily be used for timing estimation in some corner cases. The secondary pilot Ps may be designed to have varying forms over time and/or frequency.

Figure 13:
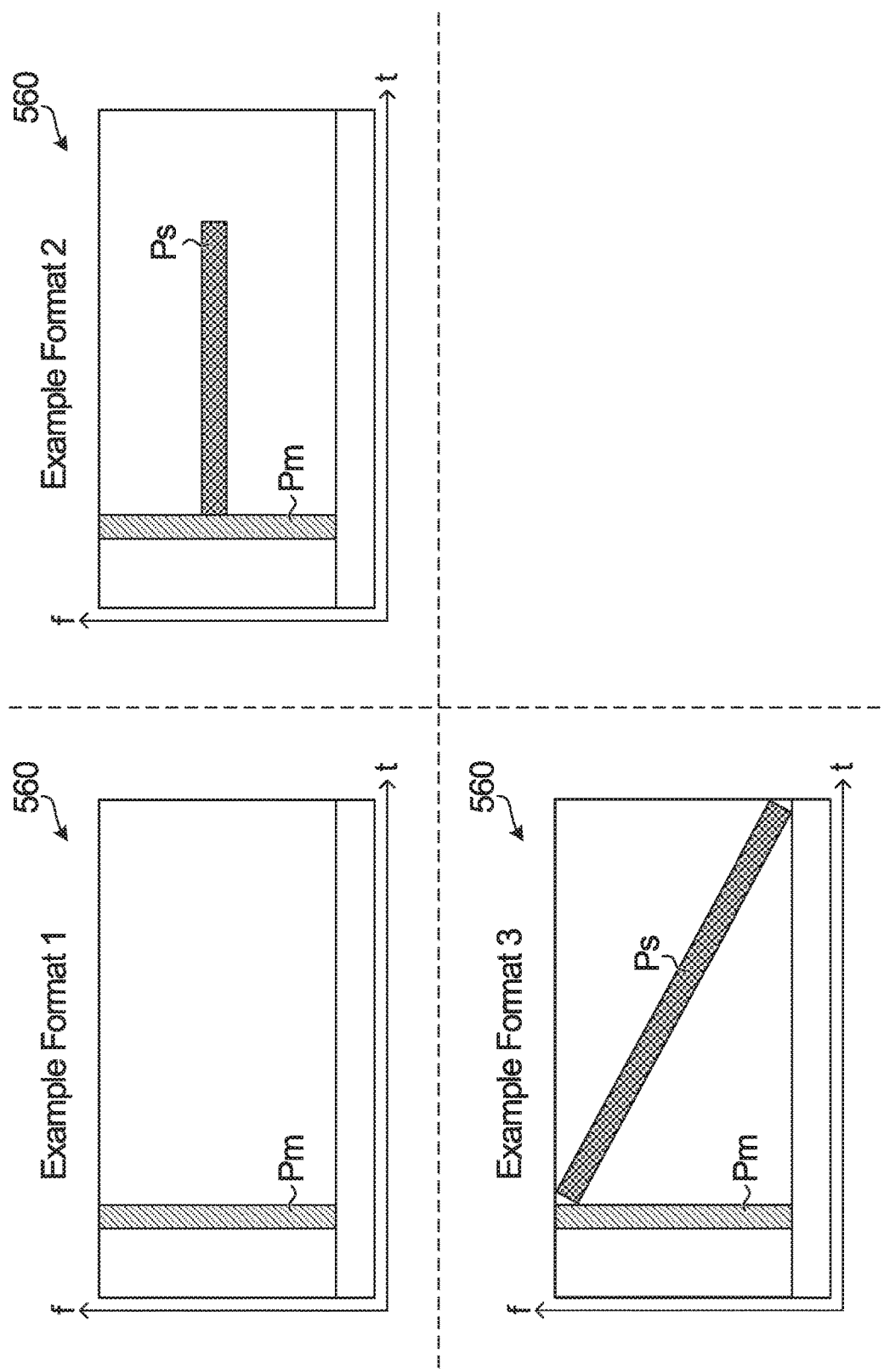

In some embodiments, a combination of Pm and Ps may be used for different configurations and usages. For example, FIG. 13 illustrates three example pilot formats in a UE transmission data and pilot area 560 of a subframe. Like in FIG. 12, specific OFDM symbols are not shown in FIG. 13 because the designs apply to subframes of any number of OFDM symbols. In Example Format 1, only Pm is present. Example Format 1 may be used when the UE is in a connected state and/or when the UE is in a synchronized state. In Example Format 2, Ps is also present, but with diversity in the time domain only. In Example Format 3, Ps has diversity in the time and frequency domain. Example Formats 2 and 3 may be used for initial access and/or when the UE is in a non-synchronized state and/or for fast moving users. Thus, in some embodiments, the reference signal may be transmitted with the data in different formats: Example Format 1+Data (optionally including UE ID implicitly or explicitly), Example Format 2+Data (optionally including UE ID implicitly or explicitly), Example Format 3+Data (optionally including UE ID implicitly or explicitly). With these different designs, it may be possible to trade-off performance versus overhead.

An example of a reference signal sequence that may be used as the reference signal is a Zadoff Chu sequence. Different Zadoff Chu sequences with the same length in a reference signal pool may be generated using different cyclic shift of the same root or using a different root. Different Zadoff Chu sequences generated this way may have low cross-correlation, which means that even if there is timing offset between different Zadoff Chu sequences, the correlation may be low. As a result, mutual interference between two Zadoff Chu sequences of the same design may be low, even if the two sequences are not synchronized in time. As a result, a Zadoff Chu sequence may be a good candidate for performing both timing advance estimation and channel estimation.

In some embodiments, the UE 102a may perform grant-free uplink transmission adaptation based on the state of access, i.e. before and after timing advance adjustment. For example, in the initial transmission in step 300 of FIG. 3, since the UE 102a is not in a synchronized state, the UE 102a may choose a robust MCS, e.g. a low MCS, such as QPSK and a code rate 1/3, and/or the UE 102a may use some form of repetition to try to increase the chance of successful decoding at the base station since the UE 102a is not uplink synchronized, and/or the reference signal used may be more robust (e.g. a reference signal having more symbols). In the subsequent transmissions, where there is timing advance and the UE 102a is in a synchronized state (e.g. step 304 of FIG. 3), the UE 102a may adapt to use a more aggressive (e.g. higher) MCS after timing advance adjustment. When the UE 102a is in a synchronized state, there may be a higher chance of the uplink transmission being successfully decoded by the base station, and so a higher MCS may be used by UE 102a.

In some embodiments, the UE 102a may adapt the reference signal design based on whether or not timing advance adjustment is being performed. For example, the initial uplink transmission in step 300 of FIG. 3 may use a reference signal design that is more suitable for timing advance estimation (e.g. one of the reference signal designs shown in FIG. 12). Then, in synchronized grant-free uplink transmission, e.g. as in step 304 of FIG. 3, the UE 102a may use a more traditional reference signal design (e.g. as shown in FIG. 11), which may be better suited for channel estimation and may have a lower PAPR. In one embodiment, the reference signal design is kept the same for steps 300 and 304 of FIG. 3 if the grant-free region used by the UE 102a in steps 300 and 304 of FIG. 3 is the same grant-free region.

In the embodiments described above in relation to FIGS. 3 to 10, the reference signal is used by the base station 100 in step 301 for both timing advance and channel estimation. More generally, the reference signal may instead be replaced with at least one MA signature. That is, at least one MA signature may be used for both timing advance and channel estimation. An MA signature may include (but is not limited to) at least one of the following: a codebook/codeword, a sequence, an interleaver and/or mapping pattern, a reference signal (e.g. a demodulation reference signal), a preamble, a spatial-dimension, and a power-dimension.

As another variation, in some embodiments a preamble (instead of a reference signal) may be used for both timing advance and channel estimation. As another variation, in some embodiments, the message sent in step 300 may include both a preamble and a reference signal. The preamble is used for timing advance estimation, and the reference signal (or both the reference signal and the preamble) is/are used for channel estimation.

As is clear from the foregoing, embodiments are provided that unify the function of the reference signal and the preamble for grant-free uplink transmission. The reference signal may replace the function of a preamble for direct grant-free access. A new reference signal design is disclosed for timing advance estimation. e.g. the reference signal may be spanned over the time domain for possibly better timing advance estimation. A universal two step grant-free access procedure is disclosed using reference signal (RS)+data and ACK+ID or NACK+RS index. A more robust MCS and/or more resources may be used for an asynchronous first transmission, and after obtaining the timing advance value, the UE may self-adapt to a more aggressive MCS after synchronization.

As is clear from the above, in some embodiments a UE performs a method that includes transmitting, to the base station, an initial grant-free uplink transmission having a reference signal. The UE then receives a timing advance value from the base station. The UE then transmits a subsequent grant-free uplink transmission including applying the timing advance value so that the subsequent grant-free uplink transmission is synchronized with uplink transmissions of other UEs.

The initial grant-free uplink transmission is not synchronized with the uplink transmissions of other UEs. In particular, the UE is operating in an unsynchronized state when the initial grant-free uplink transmission is sent, and is operating in a synchronized state when the subsequent grant-free uplink transmission is sent.

In some embodiments, the UE is in an inactive state when the initial grant-free transmission is sent, and the UE may remain in the inactive state when the subsequent grant-free uplink transmission is sent. That is, the UE may remain in the inactive state when both in the unsynchronized state and the synchronized state. In other embodiments, the UE may perform the subsequent grant-free uplink transmission in a connected state. That is, the UE may operate in the unsynchronized state when in the inactive state, and the UE may operate in the synchronized state when in the connected state.

In some embodiments, a first set of time-frequency resources may be configured for sending the initial grant-free uplink transmission, and a second set of time-frequency resources, which may be different from the first set of time-frequency resources, may be configured for sending the subsequent grant-free uplink transmission. An example is described earlier in relation to step 302 of FIG. 3, in which it is indicated that the grant-free resources configured in step 302 of FIG. 3 may be different from the resources configured for use in step 300 of FIG. 3. The first set of time-frequency resources and the second set of time-frequency resources may be configured using system information (e.g. a system information block (SIB)) and/or or higher layer signaling (e.g. RRC signaling) and/or dynamic signaling (e.g. downlink control information (DCI)). The configuration of the two set of resources may be done in advance before the initial transmission in unsynchronized state is performed. The signaling configuring the first set of time-frequency resources and the second set of time-frequency resources may be cell specific signaling or UE specific signaling. In some embodiments, signaling (e.g. RRC signaling or system information) configuring the second set of time-frequency resources is received along with the timing advance value. e.g. as described in relation to step 302 of FIG. 3.

In some embodiments, the first set of time-frequency resources are used when the UE is operating in an unsynchronized state, and the second set of time-frequency resources are used when the UE is operating in a synchronized state.

In some embodiments, the initial grant-free uplink transmission does not include a preamble.

In some embodiments, a NACK is also received along with the timing advance value. In response to receiving the NACK, the UE performs a retransmission of at least some of the data in the initial grant-free uplink transmission, prior to transmitting the subsequent grant-free uplink transmission. The retransmission may be a grant-free uplink transmission. Transmitting the retransmission includes applying the timing advance value so that the retransmission is synchronized with uplink transmissions of other UEs. An example is described earlier in relation to FIG. 9.

In other embodiments, a grant is also received along with the timing advance value. The grant schedules a retransmission of at least some of the data sent in the initial grant-free uplink transmission. The UE performs the retransmission prior to transmitting the subsequent grant-free uplink transmission. Transmitting the retransmission includes applying the timing advance value so that the retransmission is synchronized with uplink transmissions of other UEs. An example is described earlier in relation to FIG. 10.

In some embodiments, the subsequent grant-free uplink transmission uses at least one transmission parameter that is different from the initial grant-free uplink transmission. The at least one transmission parameter comprises MCS and/or channel structure and/or subcarrier spacing and/or number of symbols and/or numerology and/or reference signal parameters. One or more values of the at least one transmission parameter may be configured by being predefined, and/or by being configured in system information (e.g. in a system information block (SIB)), and/or by being configured in higher layer signaling (e.g. in RRC signaling), and/or by being selected by the UE.

From the base station's perspective, in some embodiments a method performed by the base station includes receiving, from the UE, a grant-free uplink transmission that includes a reference signal and possibly data. The base station performs timing advance estimation using the reference signal to obtain a timing advance value, and transmit the timing advance value to the UE. The base station may perform channel estimation using the reference signal. If there is data in the grant-free uplink transmission, the base station may attempt to decode the data.

In some embodiments, the grant-free uplink transmission received by the base station is an initial grant-free uplink transmission, and the method further includes: after transmitting the timing advance value to the UE, receiving a subsequent grant-free uplink transmission from the UE. The subsequent grant-free uplink transmission may be synchronized with uplink transmissions of other UEs due to the application of the timing advance value. The initial grant-free uplink transmission may be unsynchronized with uplink transmissions of other UEs.

In some embodiments, the grant-free uplink transmission includes data, and in response to unsuccessfully decoding the data, the base station transmits a NACK along with the timing advance value. The base station may then receive a retransmission of the data, which may be a grant-free retransmission. The retransmission may be synchronized with uplink transmissions of other UEs due to the application of the timing advance value. An example is described earlier in relation to FIG. 9.

In other embodiments, the grant-free uplink transmission includes data, and in response to unsuccessfully decoding the data, the base station transmits a grant along with the timing advance value. The grant may be dynamically sent, e.g., in a downlink control channel (e.g. in DCI). The grant schedules a retransmission of the data. The base station may then receive a retransmission of the data according to the grant. The retransmission may be synchronized with uplink transmissions of other UEs due to the application of the timing advance value. An example is described earlier in relation to FIG. 10.

In embodiments above there are therefore disclosed procedures for using the reference signal for both timing adjustment estimation and channel estimation. In some embodiments, a NACK to trigger a grant-free retransmission, or a grant to perform a grant-free to grant-based switch, may be sent by the base station with the timing adjustment value.

In some embodiments, there is disclosed synchronized and unsynchronized transmission resource switching with or without switching from inactive state to connected state, and resource configuration for different modes.

In some embodiments, there is disclosed transmission parameter adaptation for synchronized state that is different from unsynchronized state, e.g. using different MCS, and/or different channel structure, and/or different subcarrier spacing, and/or different number of symbols, and/or different numerology for synchronization state compared to unsynchronized state. For example, a more robust MCS may be used in an unsynchronized state compared to a synchronized state. In some embodiments, the transmission parameter values for unsynchronized and/or synchronized state may be predefined, configured in SIB or RRC, or selected by the UE.

In some embodiments, the base station may configure two set of resources, where the first set of resources are used for unsynchronized grant-free uplink transmission, and the second set of resources are used for synchronized grant-free uplink transmission. The two sets of resources may be used without switching UE state, e.g., the UE may stay in an inactive state for both transmissions. In another embodiment, the UE may be in an inactive state for a first transmission and switched to connected state for a second transmission. The two sets of resources may be configured using system information (e.g. SIB) or higher layer signaling (e.g. RRC signaling) or dynamic signaling (e.g. DCI). The signaling may be cell specific or UE specific. The first transmission may use the grant-free resources configured for the unsynchronized state, and the second transmission may use the grant-free resources configured for the synchronized state.

In some embodiments, after the UE transmits the first transmission in an unsynchronized state, the base station may send timing adjustment information, along with the grant-free resource configuration for the synchronized state.

EXAMPLES

In view of, and in addition to the above, the following examples are disclosed.

Example 1

A method performed by a base station comprising: receiving a grant-free uplink transmission from a user equipment, the grant-free uplink transmission including a reference signal; performing timing advance estimation using the reference signal to obtain a timing advance value; performing channel estimation using the reference signal; and transmitting the timing advance value to the user equipment.

Example 2

The method of example 1, wherein the grant-free uplink transmission is an initial grant-free uplink transmission, and wherein the method further comprises: after transmitting the timing advance value to the user equipment, receiving a subsequent grant-free uplink transmission from the user equipment, the subsequent grant-free uplink transmission synchronized with uplink transmissions of other user equipments due to the application of the timing advance.

Example 3

The method of example 2, wherein the subsequent grant-free uplink transmission uses different grant-free resources from the initial grant-free uplink transmission, and wherein the reference signal included in the initial grant-free uplink transmission has a format different from a reference signal included in the subsequent grant-free uplink transmission.

Example 4

The method of example 2 or example 3, wherein the subsequent grant-free uplink transmission uses a modulation and coding scheme (MCS) that is different from the initial grant-free uplink transmission.

Example 5

The method of any one of examples 1 to 4, wherein a Zadoff Chu sequence is used as the reference signal.

Example 6

The method of any one of examples 1 to 5, wherein the reference signal sequence of the reference signal has a duration that spans across a plurality of time units or time slots.

Example 7

The method of example 6, wherein the reference signal sequence of the reference signal has a duration equal to a subframe length.

Example 8

A base station comprising: a processor; and a computer readable storage medium storing programming for execution by the processor, the programming including instructions to perform steps in accordance with a method in any one of examples 1 to 7.

Example 9

A base station comprising: a receiver to receive a grant-free uplink transmission from a user equipment, the grant-free uplink transmission including a reference signal; a message processor to perform timing advance estimation using the reference signal to obtain a timing advance value, and to perform channel estimation using the reference signal; and a transmitter to transmit the timing advance value to the user equipment.

Example 10

A method performed by a user equipment comprising: transmitting, in an unsynchronized state, an initial grant-free uplink transmission to a base station, the initial grant-free uplink transmission including a reference signal; receiving a timing advance value from the base station that was computed from the reference signal; and applying the timing advance value to a subsequent grant-free uplink transmission to send the subsequent grant-free uplink transmission in a synchronized state.

Example 11

The method of example 10, wherein the subsequent grant-free uplink transmission uses different grant-free resources from the initial grant-free uplink transmission, and wherein the reference signal included in the initial grant-free uplink transmission has a format different from a reference signal included in the subsequent grant-free uplink transmission.

Example 12

The method of example 10 or example 11, wherein the subsequent grant-free uplink transmission uses a modulation and coding scheme (MCS) that is different from the initial grant-free uplink transmission.

Example 13

The method of any one of examples 10 to 12, wherein a Zadoff Chu sequence is used as the reference signal.

Example 14

The method of any one of examples 10 to 13, wherein the reference signal sequence of the reference signal has a duration that spans across a plurality of time units or time slots.

Example 15

The method of example 14, wherein the reference signal sequence of the reference signal has a duration equal to a subframe length.

Example 16

A user equipment comprising: a processor, and a computer readable storage medium storing programming for execution by the processor, the programming including instructions to perform steps in accordance with a method in any one of examples 10 to 15.

Example 17

A user equipment comprising: a transmitter to transmit, in an unsynchronized state, an initial grant-free uplink transmission to a base station; the initial grant-free uplink transmission including a reference signal; a receiver to receive a timing advance value from the base station that was computed from the reference signal; the transmitter to apply the timing advance value to a subsequent grant-free uplink transmission to send the subsequent grant-free uplink transmission in a synchronized state.

Example 18

A method performed by a UE, the method comprising: transmitting an initial grant-free uplink transmission to a base station, the initial grant-free uplink transmission including a reference signal; receiving a timing advance value from the base station; and transmitting a subsequent grant-free uplink transmission including applying the timing advance value so that the subsequent grant-free uplink transmission is synchronized with uplink transmissions of other UEs.

Example 19

The method of example 18, wherein the timing advance value received from the base station was computed from the reference signal.

Example 20

The method of example 18 or 19, wherein the initial grant-free uplink transmission is not synchronized with uplink transmissions of other UEs.

Example 21

The method of any one of examples 18 to 20, wherein the UE is operating in an inactive state when the initial grant-free uplink transmission is sent.

Example 22

The method of example 21, wherein the UE remains in the inactive state when the subsequent grant-free uplink transmission is sent.

Example 23

The method of example 21, wherein the UE performs the subsequent grant-free uplink transmission in a connected state.

Example 24

The method of any one of examples 18 to 23, wherein a first set of time-frequency resources are configured for sending the initial grant-free uplink transmission and a second set of time-frequency resources are configured for sending the subsequent grant-free uplink transmission.

Example 25

The method of example 24, wherein the first set of time-frequency resources and the second set of time-frequency resources are configured using system information and/or higher layer signaling and/or dynamic signaling.

Example 26

The method of example 25, wherein the system information comprises a system information block (SIB), wherein the higher layer signaling comprises radio resource control (RRC) signaling, and wherein the dynamic signaling comprises downlink control information (DCI).

Example 27

The method of any one of examples 24 to 26, wherein signaling configuring the first set of time-frequency resources and the second set of time-frequency resources is cell specific signaling and/or UE specific signaling.

Example 28

The method of example 24, wherein signaling is received along with the timing advance value, the signaling configuring the second set of time-frequency resources.

Example 29

The method of example 28, wherein the signaling is higher layer signaling, e.g. RRC signaling.

Example 30

The method of any one of examples 24 to 29, wherein the first set of time-frequency resources are used when the UE is operating in an unsynchronized state, and wherein the second set of time-frequency resources are used when the UE is operating in a synchronized state.

Example 31

The method of any one of examples 18 to 30, wherein the initial grant-free uplink transmission is sent when the UE is in an unsynchronized state, i.e. the initial grant-free uplink transmission is not synchronized with uplink transmissions from other UEs, which means that the initial grant-free uplink transmission does not arrive at the base station synchronized with the arrival, at the base station, of other uplink transmissions from other UEs.

Example 32

The method of any one of examples 18 to 31, wherein the initial grant-free uplink transmission also includes data.

Example 33

The method of any one of examples 18 to 32, wherein the reference signal is for use by the base station for channel estimation.

Example 34

The method of any one of examples 18 to 33, wherein the initial grant-free uplink transmission does not include a preamble.

Example 35

The method of any one of examples 18 to 34, wherein a NACK is also received along with the timing advance value, and in response to receiving the NACK the UE performs a retransmission of at least data sent in the initial grant-free uplink transmission, prior to transmitting the subsequent grant-free uplink transmission; and wherein transmitting the retransmission includes applying the timing advance value so that the retransmission is synchronized with uplink transmissions of other UEs.

Example 36

The method of any one of examples 18 to 34, wherein a grant is also received along with the timing advance value, the grant scheduling a retransmission of at least data sent in the initial grant-free uplink transmission; wherein the UE performs the retransmission prior to transmitting the subsequent grant-free uplink transmission; and wherein transmitting the retransmission includes applying the timing advance value so that the retransmission is synchronized with uplink transmissions of other UEs.

Example 37

The method of any one of examples 18 to 36, wherein the subsequent grant-free uplink transmission uses an MCS that is different from the initial grant-free uplink transmission.

Example 38

The method of any one of examples 18 to 36, wherein the subsequent grant-free uplink transmission has at least one transmission parameter that is different from the initial grant-free uplink transmission; wherein the at least one transmission parameter comprises one or more of: MCS, channel structure, subcarrier spacing, number of symbols, and numerology.

Example 39

The method of example 38, wherein one or more values of the at least one transmission parameter is configured by at least one of: being predefined, being configured in system information, being configured in higher layer signaling, and being selected by the UE.

Example 40

The method of any one of examples 18 to 34, wherein the subsequent grant-free uplink transmission is a retransmission of at least data sent in the initial grant-free uplink transmission.

Example 41

The method of any one of examples 18 to 34, further comprising after transmitting the initial grant-free uplink transmission: receiving a retransmission grant indicating both the timing adjustment value and retransmission resources, and retransmitting the subsequent grant-free uplink transmission according to the retransmission grant after applying the timing advance value.

Example 42

A user equipment (UE) comprising: a transmitter to transmit an initial grant-free uplink transmission to a base station, the initial grant-free uplink transmission including a reference signal; a receiver to receive a timing advance value from the base station; and the transmitter to transmit a subsequent grant-free uplink transmission by applying the timing advance value so that the subsequent grant-free uplink transmission is synchronized with uplink transmissions of other UEs.

Example 43

The UE of example 42, wherein the timing advance value was computed from the reference signal.

Example 44

The UE of example 42 or 43, wherein the initial grant-free uplink transmission is not synchronized with uplink transmissions of other UEs.

Example 45

The UE of any one of examples 42 to 44, wherein the UE is configured to operate in an inactive state when the initial grant-free uplink transmission is sent.

Example 46

The UE of example 45, wherein the UE is configured to remain in the inactive state when the subsequent grant-free uplink transmission is sent.

Example 47

The UE of example 45, wherein the UE is configured to perform the subsequent grant-free uplink transmission in a connected state.

Example 48

The UE of any one of examples 42 to 47, wherein a first set of time-frequency resources are configured for sending the initial grant-free uplink transmission and a second set of time-frequency resources are configured for sending the subsequent grant-free uplink transmission.

Example 49

The UE of example 48, wherein the first set of time-frequency resources and the second set of time-frequency resources are configured using system information and/or higher layer signaling and/or dynamic signaling.

Example 50

The UE of example 49, wherein the system information comprises a system information block (SIB), wherein the higher layer signaling comprises radio resource control (RRC) signaling, and wherein the dynamic signaling comprises downlink control information (DCI).

Example 51

The UE of any one of examples 48 to 50, wherein signaling configuring the first set of time-frequency resources and the second set of time-frequency resources is cell specific signaling and/or UE specific signaling.

Example 52

The UE of example 48, wherein signaling is configured to be received along with the timing advance value, the signaling configuring the second set of time-frequency resources.

Example 53

The UE of example 52, wherein the signaling is higher layer signaling, e.g. RRC signaling.

Example 54

The UE of any one of examples 48 to 53, wherein the first set of time-frequency resources are configured to be used when the UE is operating in an unsynchronized state, and wherein the second set of time-frequency resources are configured to be used when the UE is operating in a synchronized state.

Example 55

The UE of any one of examples 42 to 54, wherein the initial grant-free uplink transmission is configured to be sent when the UE is in an unsynchronized state.

Example 56

The UE of any one of examples 42 to 55, wherein the initial grant-free uplink transmission also includes data.

Example 57

The UE of any one of examples 42 to 56, wherein the reference signal is for use by the base station for channel estimation.

Example 58

The UE of any one of examples 42 to 57, wherein the initial grant-free uplink transmission does not include a preamble.

Example 59

The UE of any one of examples 42 to 58, wherein the receiver is further configured to receive a NACK along with the timing advance value, and in response to receiving the NACK the UE is configured to perform a retransmission of at least data sent in the initial grant-free uplink transmission, prior to transmitting the subsequent grant-free uplink transmission; and wherein the retransmission includes applying the timing advance value so that the retransmission is synchronized with uplink transmissions of other UEs.

Example 60

The UE of any one of examples 42 to 58, wherein the receiver is further configured to receive a grant along with the timing advance value, the grant scheduling a retransmission of at least data sent in the initial grant-free uplink transmission; wherein the UE is configured to perform the retransmission prior to transmitting the subsequent grant-free uplink transmission; and wherein the retransmission includes applying the timing advance value so that the retransmission is synchronized with uplink transmissions of other UEs.

Example 61

The UE of any one of examples 42 to 60, wherein the subsequent grant-free uplink transmission uses a MCS that is different from the initial grant-free uplink transmission.

Example 62

The UE of any one of examples 42 to 60, wherein the subsequent grant-free uplink transmission has at least one transmission parameter that is different from the initial grant-free uplink transmission; wherein the at least one transmission parameter comprises one or more of: MCS, channel structure, subcarrier spacing, number of symbols, and numerology.

Example 63

The UE of example 62, wherein one or more values of the at least one transmission parameter is configured by at least one of: being predefined, being configured in system information, being configured in higher layer signaling, and being selected by the UE.

Example 64

The UE of any one of examples 42 to 58, wherein the subsequent grant-free uplink transmission is a retransmission of at least data sent in the initial grant-free uplink transmission.

Example 65

The UE of any one of examples 42 to 58, wherein after the initial grant-free uplink transmission: the receiver is configured to receive a retransmission grant indicating both the timing adjustment value and retransmission resources, and the transmitter is configured to retransmit the subsequent grant-free uplink transmission according to the retransmission grant after applying the timing advance value.

Example 66

A method performed by a base station, the method comprising: receiving a grant-free uplink transmission from a UE, the grant-free uplink transmission including a reference signal; performing timing advance estimation using the reference signal to obtain a timing advance value; optionally performing channel estimation using the reference signal; and transmitting the timing advance value to the UE.

Example 67

The method of example 66, wherein the grant-free uplink transmission is an initial grant-free uplink transmission, and wherein the method further comprises: after transmitting the timing advance value to the UE, receiving a subsequent grant-free uplink transmission from the UE, the subsequent grant-free uplink transmission synchronized with uplink transmissions of other UEs due to the application of the timing advance value.

Example 68

The method of example 67, wherein the initial grant-free uplink transmission is not synchronized with uplink transmissions of other UEs.

Example 69

The method of example 67 or 68, wherein a first set of time-frequency resources are configured for receiving the initial grant-free uplink transmission and a second set of time-frequency resources are configured for receiving the subsequent grant-free uplink transmission.

Example 70

The method of example 69, wherein the first set of time-frequency resources and the second set of time-frequency resources are configured using system information and/or higher layer signaling and/or dynamic signaling.

Example 71

The method of example 69, further comprising transmitting signaling along with the timing advance value, the signaling configuring the second set of time-frequency resources.

Example 72

The method of any one of examples 67 to 71, wherein the initial grant-free uplink transmission does not include a preamble.

Example 73

The method of any one of examples 66 to 73, wherein the grant-free uplink transmission includes data, and the method further comprises attempting to decode the data.

Example 74

The method of example 73, wherein the method further comprises: in response to unsuccessfully decoding the data, transmitting a NACK along with the timing advance value; receiving a retransmission of the data, the retransmission synchronized with uplink transmissions of other UEs due to the application of the timing advance value.

Example 75

The method of example 73, wherein the method further comprises: in response to unsuccessfully decoding the data, transmitting a grant along with the timing advance value, the grant scheduling a retransmission of the data; receiving a retransmission of the data according to the grant, the retransmission synchronized with uplink transmissions of other UEs due to the application of the timing advance value.

Example 76

The method of example 67, wherein the subsequent grant-free uplink transmission uses at least one transmission parameter that is different from the initial grant-free uplink transmission; wherein the at least one transmission parameter comprises one or more of: MCS, channel structure, subcarrier spacing, number of symbols, and numerology.

Example 77

The method of example 67, wherein the subsequent grant-free uplink transmission is a retransmission of at least data received in the initial grant-free uplink transmission.

Example 78

The method of example 67, further comprising after receiving the initial grant-free uplink transmission: transmitting a retransmission grant indicating both the timing adjustment value and retransmission resources, and receiving a retransmission of the subsequent grant-free uplink transmission according to the retransmission grant, the retransmission synchronized with uplink transmissions of other UEs.

Example 79

A base station comprising: a receiver to receive a grant-free uplink transmission from a UE, the grant-free uplink transmission including a reference signal; a message processor to perform timing advance estimation using the reference signal to obtain a timing advance value, and optionally to perform channel estimation using the reference signal; and a transmitter to transmit the timing advance value to the UE.

Example 80

The base station of example 79, wherein the grant-free uplink transmission is an initial grant-free uplink transmission, and wherein after transmitting the timing advance value to the UE, the receiver is configured to receive a subsequent grant-free uplink transmission from the UE, the subsequent grant-free uplink transmission synchronized with uplink transmissions of other UEs due to the application of the timing advance value.

Example 81

The base station of example 80, wherein the initial grant-free uplink transmission is not synchronized with uplink transmissions of other UEs.

Example 82

The base station of example 80 or 81, wherein a first set of time-frequency resources are configured for receiving the initial grant-free uplink transmission and a second set of time-frequency resources are configured for receiving the subsequent grant-free uplink transmission.

Example 83

The base station of example 82, wherein the first set of time-frequency resources and the second set of time-fre-

Example 84

The base station of example 82, wherein the transmitter is configured to transmit signaling along with the timing advance value, the signaling configuring the second set of time-frequency resources.

Example 85

The base station of any one of example 80 to 84, wherein the initial grant-free uplink transmission does not include a preamble.

Example 86

The base station of any one of examples 79 to 85, wherein the grant-free uplink transmission includes data, and the message processor is configured to attempt to decode the data.

Example 87

The base station of example 86, wherein in response to unsuccessfully decoding the data, the transmitter is configured to transmit a NACK along with the timing advance value; and wherein the receiver is configured to receive a retransmission of the data, the retransmission synchronized with uplink transmissions of other UEs due to the application of the timing advance value.

Example 88

The base station of example 86, wherein in response to unsuccessfully decoding the data, the transmitter is to transmit a grant along with the timing advance value, the grant scheduling a retransmission of the data; and wherein the receiver is to receive a retransmission of the data according to the grant, the retransmission synchronized with uplink transmissions of other UEs due to the application of the timing advance value.

Example 89

The base station of example 80, wherein the subsequent grant-free uplink transmission uses at least one transmission parameter that is different from the initial grant-free uplink transmission; wherein the at least one transmission parameter comprises one or more of: MCS, channel structure, subcarrier spacing, number of symbols, and numerology.

Example 90

The base station of example 80, wherein the subsequent grant-free uplink transmission is a retransmission of at least data received in the initial grant-free uplink transmission.

Example 91

The base station of example 80, wherein after receiving the initial grant-free uplink transmission: the transmitter is configured to transmit a retransmission grant indicating both the timing adjustment value and retransmission resources, and the receiver is configured to receive a retransmission of the subsequent grant-free uplink transmission according to the retransmission grant, the retransmission synchronized with uplink transmissions of other UEs.

Example 92

A method performed by a user equipment (UE), the method comprising: transmitting, in an inactive state, an initial grant-free uplink transmission to a base station, the initial grant-free uplink transmission including a reference signal and data, and the initial grant-free uplink transmission transmitted asynchronously with uplink transmissions from other UEs; receiving a signal indicating a timing advance (TA) value from the base station, wherein the TA value is obtained based on the reference signal; and transmitting a subsequent grant-free uplink transmission being synchronized with uplink transmissions from other UEs based on the timing advance value.

Example 93

The method of example 92, wherein the UE remains in the inactive state before the subsequent grant-free uplink transmission is sent.

Example 94

The method of example 92 or 93, further comprising: obtaining, by the UE, a first set of time-frequency resources used for sending the initial grant-free uplink transmission and a second set of time-frequency resources used for sending the subsequent grant-free uplink transmission.

Example 95

The method of example 94, wherein the signal further indicates the second set of time-frequency resources used for sending the subsequent grant-free uplink transmission.

Example 96

The method of any one of examples 92 to 95, wherein the initial grant-free uplink transmission does not include a preamble.

Example 97

The method of any one of examples 92 to 96, wherein a grant is also received along with the signal indicating the TA value, the grant scheduling a retransmission of the data sent in the initial grant-free uplink transmission; wherein the UE performs the retransmission prior to transmitting the subsequent grant-free uplink transmission; and wherein transmitting the retransmission includes applying the TA value so that the retransmission is synchronized with uplink transmissions of other UEs.

Example 98

The method of any one of examples 92 to 97, wherein the subsequent grant-free uplink transmission has at least one transmission parameter that is different from the initial grant-free uplink transmission; wherein the at least one transmission parameter is associated with whether the UE has its uplink transmissions synchronized or asynchronized, and wherein the at least one transmission parameter comprises one or more of: MCS, channel structure, subcarrier spacing, number of symbols, and numerology.

Example 99

A UE comprising: a transmitter to transmit, in an inactive state, an initial grant-free uplink transmission to a base station, the initial grant-free uplink transmission including a reference signal and data, and the initial grant-free uplink transmission transmitted asynchronously with uplink transmissions from other UEs; a receiver to receive a signal indicating a timing advance (TA) value from the base station, wherein the TA value is obtained based on the reference signal; and the transmitter to transmit a subsequent grant-free uplink transmission that is synchronized with uplink transmissions from other UEs based on the timing advance value.

Example 100

The UE of example 99, wherein the UE is configured to remain in the inactive state before the subsequent grant-free uplink transmission is sent.

Example 101

The UE of example 99 or 100, wherein the UE is configured to obtain a first set of time-frequency resources used for sending the initial grant-free uplink transmission and a second set of time-frequency resources used for sending the subsequent grant-free uplink transmission.

Example 102

The UE of example 101, wherein the signal further indicates the second set of time-frequency resources used for sending the subsequent grant-free uplink transmission.

Example 103

The UE of any one of examples 99 to 102, wherein the initial grant-free uplink transmission does not include a preamble.

Example 104

The UE of any one of examples 99 to 103, wherein the receiver is to receive a grant along with the signal indicating the TA value, the grant scheduling a retransmission of the data sent in the initial grant-free uplink transmission; wherein the UE is configured to perform the retransmission prior to transmitting the subsequent grant-free uplink transmission; and wherein the retransmission includes applying the TA value so that the retransmission is synchronized with uplink transmissions of other UEs.

Example 105

The UE of any one of examples 99 to 104, wherein the subsequent grant-free uplink transmission has at least one transmission parameter that is different from the initial grant-free uplink transmission; wherein the at least one transmission parameter is associated with whether the UE has its uplink transmissions synchronized or asynchronized, and wherein the at least one transmission parameter comprises one or more of: MCS, channel structure, subcarrier spacing, number of symbols, and numerology.

Example 106

A method performed by a base station, the method comprising: receiving a grant-free uplink transmission from a user equipment (UE) in an inactive state, the grant-free uplink transmission including a reference signal and data, and the grant-free uplink transmission being received asynchronously with uplink transmissions from other UEs; performing timing advance estimation based on the reference signal to obtain a timing advance value; performing channel estimation using the reference signal; and transmitting a signal indicating the timing advance value to the UE.

Example 107

The method of example 106, wherein the grant-free uplink transmission is an initial grant-free uplink transmission, and wherein the method further comprises: after transmitting the signal indicating the timing advance value to the UE, receiving a subsequent grant-free uplink transmission from the UE, the subsequent grant-free uplink transmission synchronized with uplink transmissions from other UEs based on the timing advance value.

Example 108

The method of example 107, wherein a first set of time-frequency resources are configured for receiving the initial grant-free uplink transmission and a second set of time-frequency resources are configured for receiving the subsequent grant-free uplink transmission.

Example 109

The method of example 108, wherein the signal further indicates the second set of time-frequency resources.

Example 110

The method of any one of examples 107 to 109, wherein the initial grant-free uplink transmission does not include a preamble.

Example 111

The method of any one of examples 106 to 110, wherein the method further comprises: in response to unsuccessfully decoding the data, transmitting a grant along with the signal indicating the TA value, the grant scheduling a retransmission of the data; receiving a retransmission of the data according to the grant, the retransmission synchronized with uplink transmissions of other UEs based on the timing advance value.

Example 112

The method of example 107, wherein the subsequent grant-free uplink transmission uses at least one transmission parameter that is different from the initial grant-free uplink transmission; wherein the at least one transmission parameter is associated with whether the UE has its uplink transmissions synchronized or asynchronized, and wherein the at least one transmission parameter comprises one or more of: MCS, channel structure, subcarrier spacing, number of symbols, and numerology.

Example 113

A base station comprising: a receiver to receive a grant-free uplink transmission from a user equipment (UE) in an inactive state, the grant-free uplink transmission including a reference signal and data, and the grant-free uplink transmission being received asynchronously with uplink transmissions from other UEs; a message processor to perform timing advance estimation based on the reference signal to obtain a timing advance value, and to perform channel estimation using the reference signal; and a transmitter to transmit a signal indicating the timing advance value to the UE.

Example 114

The base station of example 113, wherein the grant-free uplink transmission is an initial grant-free uplink transmission, and wherein after transmitting the signal indicating the timing advance value to the UE, the receiver is to receive a subsequent grant-free uplink transmission from the UE, the subsequent grant-free uplink transmission synchronized with uplink transmissions from other UEs based on the timing advance value.

Example 115

The base station of example 114, wherein a first set of time-frequency resources are configured for receiving the initial grant-free uplink transmission and a second set of time-frequency resources are configured for receiving the subsequent grant-free uplink transmission.

Example 116

The base station of example 115, wherein the signal further indicates the second set of time-frequency resources.

Example 117

The base station of any one of examples 114 to 116, wherein the initial grant-free uplink transmission does not include a preamble.

Example 118

The base station of any one of examples 113 to 117, wherein in response to unsuccessfully decoding the data, the transmitter is configured to transmit a grant along with the signal indicating the TA value, the grant scheduling a retransmission of the data; and wherein the receiver is to receive a retransmission of the data according to the grant, the retransmission synchronized with uplink transmissions of other UEs based on the timing advance value.

Example 119

The base station of example 114, wherein the subsequent grant-free uplink transmission uses at least one transmission parameter that is different from the initial grant-free uplink transmission; wherein the at least one transmission parameter is associated with whether the UE has its uplink transmissions synchronized or asynchronized, and wherein the at least one transmission parameter comprises one or more of: MCS, channel structure, subcarrier spacing, number of symbols, and numerology.

Example 120

A base station comprising a memory and at least one processor, wherein instructions are stored in the memory that, when executed by the at least one processor, cause the base station to perform any one of the base station method examples outlined above.

Example 121

A UE comprising a memory and at least one processor, wherein instructions are stored in the memory that, when executed by the at least one processor, cause the UE to perform any one of the UE method examples outlined above.

CONCLUSION

Although the present invention has been described with reference to specific features and embodiments thereof, various modifications and combinations can be made thereto without departing from the invention. The description and drawings are, accordingly, to be regarded simply as an illustration of some embodiments of the invention as defined by the appended claims, and are contemplated to cover any and all modifications, variations, combinations or equivalents that fall within the scope of the present invention. Therefore, although the present invention and its advantages have been described in detail, various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

Moreover, any module, component, or device exemplified herein that executes instructions may include or otherwise have access to a non-transitory computer/processor readable storage medium or media for storage of information, such as computer/processor readable instructions, data structures, program modules, and/or other data. A non-exhaustive list of examples of non-transitory computer/processor readable storage media includes magnetic cassettes, magnetic tape, magnetic disk storage or other magnetic storage devices, optical disks such as compact disc read-only memory (CD-ROM), digital video discs or digital versatile disc (DVDs), Blu-ray Disc™, or other optical storage, volatile and non-volatile, removable and non-removable media implemented in any method or technology, random-access memory (RAM), read-only memory (ROM), electrically erasable programmable read-only memory (EEPROM), flash memory or other memory technology. Any such non-transitory computer/processor storage media may be part of a device or accessible or connectable thereto. Any application or module herein described may be implemented using computer/processor readable/executable instructions that may be stored or otherwise held by such non-transitory computer/processor readable storage media.

The invention claimed is:

1. A method performed by a user equipment (UE), the method comprising:
    transmitting, in an inactive state, an initial grant-free uplink transmission to a base station, wherein the initial grant-free uplink transmission does not include a random access channel (RACH) preamble for timing advance (TA) estimation, but instead includes a demodulation reference signal (DMRS) that is used for both uplink channel estimation and for the TA estimation, and wherein the initial grant-free uplink transmission also includes data;
    receiving a signal indicating a TA value from the base station, wherein the TA value is obtained based on the DMRS used for the uplink channel estimation;
    receiving, along with the signal indicating the TA value, a grant scheduling a retransmission of the data sent in the initial grant-free uplink transmission;
    transmitting the retransmission including applying the TA value so that the retransmission is synchronized with uplink transmissions of other UEs;
    after transmitting the retransmission, transmitting a subsequent grant-free uplink transmission based on the TA value;
    obtaining, by the UE, a first set of time-frequency resources used for sending the initial grant-free uplink transmission and a second set of time-frequency resources used for sending the subsequent grant-free uplink transmission, and
    wherein the signal indicating the TA value further indicates the second set of time-frequency resources used for sending the subsequent grant-free uplink transmission.

2. The method of claim 1, wherein the UE remains in the inactive state before the subsequent grant-free uplink transmission is sent.

3. The method of claim 1, wherein the subsequent grant-free uplink transmission has at least one transmission parameter that is different from the initial grant-free uplink transmission; wherein the at least one transmission parameter is associated with whether the UE has its uplink transmissions synchronized or asynchronized, and wherein the at least one transmission parameter comprises one or more of: MCS, channel structure, subcarrier spacing, number of symbols, and numerology.

4. A UE comprising:
    a transmitter to transmit, in an inactive state, an initial grant-free uplink transmission to a base station, wherein the initial grant-free uplink transmission does not include a random access channel (RACH) preamble for timing advance (TA) estimation, but instead includes a demodulation reference signal (DMRS) that is used for both uplink channel estimation and for the TA estimation, and wherein the initial grant-free uplink transmission also includes data;
    a receiver to receive a signal indicating a TA value from the base station, wherein the TA value is obtained based on the DMRS used for the uplink channel estimation;
    the receiver to receive, along with the signal indicating the TA value, a grant scheduling a retransmission of the data sent in the initial grant-free uplink transmission;
    the transmitter to transmit the retransmission including applying the TA value so that the retransmission is synchronized with uplink transmissions of other UEs;
    after transmitting the retransmission, the transmitter to transmit a subsequent grant-free uplink transmission based on the TA value,
    wherein the UE is configured to obtain a first set of time-frequency resources used for sending the initial grant-free uplink transmission and a second set of time-frequency resources used for sending the subsequent grant-free uplink transmission; and
    wherein the signal indicating the TA value further indicates the second set of time-frequency resources used for sending the subsequent grant-free uplink transmission.

5. The UE of claim 4, wherein the UE is configured to remain in the inactive state before the subsequent grant-free uplink transmission is sent.

6. The UE of claim 4, wherein the subsequent grant-free uplink transmission has at least one transmission parameter that is different from the initial grant-free uplink transmission; wherein the at least one transmission parameter is associated with whether the UE has its uplink transmissions synchronized or asynchronized, and wherein the at least one transmission parameter comprises one or more of: MCS, channel structure, subcarrier spacing, number of symbols, and numerology.

7. A method performed by a base station, the method comprising:
    receiving an initial grant-free uplink transmission from a user equipment (UE) in an inactive state, wherein the initial grant-free uplink transmission does not include a random access channel (RACH) preamble for timing advance (TA) estimation, but instead includes a demodulation reference signal (DMRS) that is used for both uplink channel estimation and for the TA estimation, and wherein the grant-free uplink transmission also includes data;
    performing the TA estimation based on the DMRS to obtain a TA value;
    performing the channel estimation using the DMRS;
    transmitting a signal indicating the TA value to the UE,
    in response to unsuccessfully decoding the data, transmitting a grant along with the signal indicating the TA value, the grant scheduling a retransmission of the data;
    receiving a retransmission of the data according to the grant, the retransmission synchronized with uplink transmissions of other UEs based on the TA value;
    after transmitting the signal indicating the TA value to the UE, receiving a subsequent grant-free uplink transmission from the UE, the subsequent grant-free uplink transmission synchronized with uplink transmissions from other UEs based on the TA value,
    wherein a first set of time-frequency resources are configured for receiving the initial grant-free uplink transmission and a second set of time-frequency resources are configured for receiving the subsequent grant-free uplink transmission; and
    wherein the signal indicating the TA value further indicates the second set of time-frequency resources.

8. The method of claim 7, wherein the subsequent grant-free uplink transmission uses at least one transmission parameter that is different from the initial grant-free uplink transmission; wherein the at least one transmission parameter is associated with whether the UE has its uplink transmissions synchronized or asynchronized, and wherein the at least one transmission parameter comprises one or more of: MCS, channel structure, subcarrier spacing, number of symbols, and numerology.

9. A base station comprising:

a receiver to receive an initial grant-free uplink transmission from a user equipment (UE) in an inactive state, wherein the initial grant-free uplink transmission does not include a random access channel (RACH) preamble for timing advance (TA) estimation, but instead includes a demodulation reference signal (DMRS) that is used for both uplink channel estimation and for the TA estimation, and wherein the initial grant-free uplink transmission also includes data;

a message processor to perform the TA estimation based on the DMRS to obtain a TA value, and to perform the channel estimation using the DMRS;

a transmitter to transmit a signal indicating the TA value to the UE, in response to unsuccessfully decoding the data, the transmitter is configured to transmit a grant along with the signal indicating the TA value, the grant scheduling a retransmission of the data;

the receiver to receive a retransmission of the data according to the grant, the retransmission synchronized with uplink transmissions of other UEs based on the TA value;

after transmitting the signal indicating the TA value to the UE, the receiver is to receive a subsequent grant-free uplink transmission from the UE, the subsequent grant-free uplink transmission synchronized with uplink transmissions from other UEs based on the TA value, wherein a first set of time-frequency resources are configured for receiving the initial grant-free uplink transmission and a second set of time-frequency resources are configured for receiving the subsequent grant-free uplink transmission, and wherein the signal indicating the TA value further indicates the second set of time-frequency resources.

10. The base station of claim 9, wherein the subsequent grant-free uplink transmission uses at least one transmission parameter that is different from the initial grant-free uplink transmission; wherein the at least one transmission parameter is associated with whether the UE has its uplink transmissions synchronized or asynchronized, and wherein the at least one transmission parameter comprises one or more of: MCS, channel structure, subcarrier spacing, number of symbols, and numerology.

* * * * *